US012059830B2

(12) United States Patent
Baer et al.

(10) Patent No.: US 12,059,830 B2
(45) Date of Patent: Aug. 13, 2024

(54) MULTILAYERED STRUCTURES AND USES THEREOF IN SECURITY MARKINGS

(71) Applicant: CASE WESTERN RESERVE UNIVERSITY, Cleveland, OH (US)

(72) Inventors: Eric Baer, Cleveland Heights, OH (US); Andy Olah, Spencer, OH (US); Zhenpeng Li, Shaker Heights, OH (US); Michael Hore, Shaker Heights, OH (US); Cong Zhang, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 135 days.

(21) Appl. No.: 17/832,892

(22) Filed: Jun. 6, 2022

(65) Prior Publication Data

US 2023/0137096 A1    May 4, 2023

Related U.S. Application Data

(63) Continuation of application No. 17/543,272, filed on Dec. 6, 2021, now Pat. No. 11,351,710, which is a (Continued)

(51) Int. Cl.
*B29C 48/00*  (2019.01)
*B29C 48/08*  (2019.01)
(Continued)

(52) U.S. Cl.
CPC ........... *B29C 48/001* (2019.02); *B29C 48/08* (2019.02); *B29C 48/21* (2019.02); *B42D 25/378* (2014.10); *B42D 25/45* (2014.10); *G02B 1/04* (2013.01); *G02B 5/1814* (2013.01); *B29K 2105/0032* (2013.01); *B29L 2007/008* (2013.01); *B42D 25/21* (2014.10); *B42D 25/324* (2014.10); *B42D 25/328* (2014.10); *B42D 25/382* (2014.10); *B42D 25/387* (2014.10); *G02B 2005/1804* (2013.01)

(58) Field of Classification Search
CPC ....... B29C 48/001; B29C 48/08; B29C 48/21; B29C 48/185; B29C 48/305; B29C 48/495; B29C 48/71; B42D 25/378; B42D 25/45; B42D 25/21; B42D 25/324; B42D 25/328; B42D 25/382; B42D 25/387; B42D 25/455; G02B 1/04; G02B 5/1814; G02B 2005/1804; G02B 1/005; B29K 2105/0032; B29L 2007/008
See application file for complete search history.

(56) References Cited

U.S. PATENT DOCUMENTS 10,912,663 B2 * 2/2021 Yaniv ................... A61F 2/86
11,014,341 B2 * 5/2021 Baer ..................... B29C 48/21

FOREIGN PATENT DOCUMENTS

CN         104736349 A  *  6/2015  ............... B26F 1/24

\* cited by examiner

*Primary Examiner* — Mohamed K Amara
(74) *Attorney, Agent, or Firm* — Tarolli, Sundheim, Covell & Tummino LLP

(57) ABSTRACT

A security marking has a physically unclonable function (PUF) wherein the PUF includes a disordered multilayer photonic crystal structure having an electromagnetic transmission and/or reflection spectrum and/or spectra upon receipt of electromagnetic radiation within a photonic bandgap region of the structure that is unique to the structure.

16 Claims, 36 Drawing Sheets

Related U.S. Application Data continuation-in-part of application No. 16/441,982, filed on Jun. 14, 2019, now Pat. No. 11,194,094.

(60) Provisional application No. 62/811,797, filed on Feb. 28, 2019, provisional application No. 62/755,947, filed on Nov. 5, 2018.

(51) Int. Cl.
| | |
|---|---|
| *B29C 48/21* | (2019.01) |
| *B42D 25/378* | (2014.01) |
| *B42D 25/45* | (2014.01) |
| *G02B 1/04* | (2006.01) |
| *G02B 5/18* | (2006.01) |
| B29K 105/00 | (2006.01) |
| B29L 7/00 | (2006.01) |
| B42D 25/21 | (2014.01) |
| B42D 25/324 | (2014.01) |
| B42D 25/328 | (2014.01) |
| B42D 25/382 | (2014.01) |
| B42D 25/387 | (2014.01) |

A. Example of Multilayer Photonic System
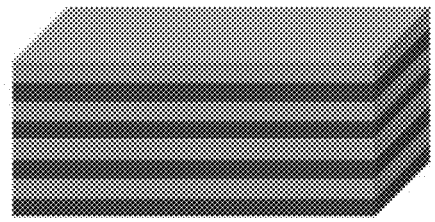
128 Layer PVAc/PU (Pellethane) Film
Layer Thickness = 94-102 nm
Δn=0.09,
B.
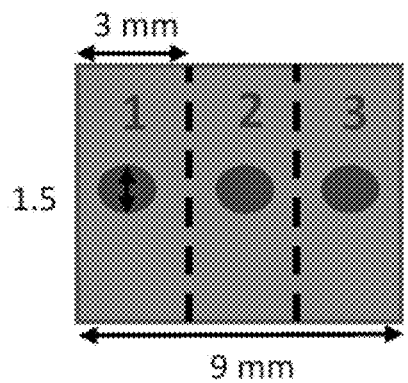
C.
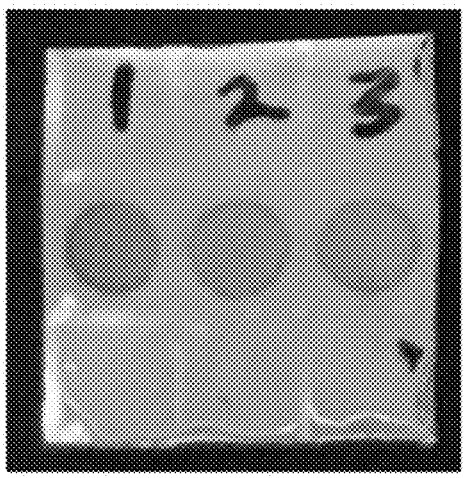
Actual Film Specimen with Coating
identifying for UV-Vis Analysis and having
Dimensions Similar to Schematic
Figs. 3A-C

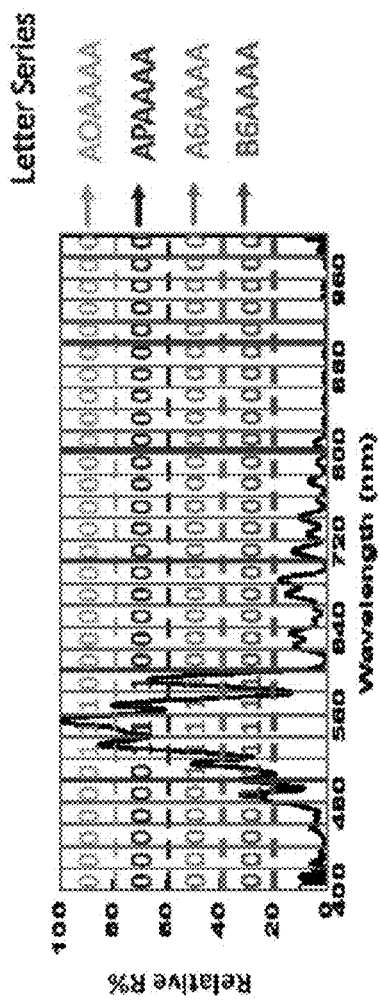
Fig. 7A
A) 3 mm DIAMETER
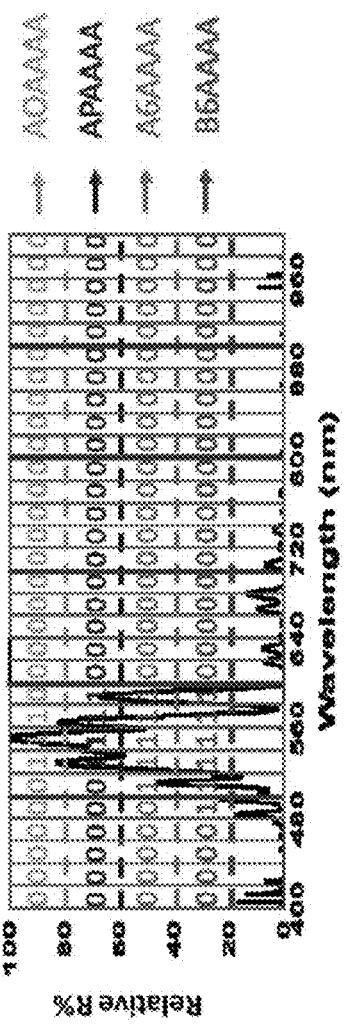
Fig. 7B
B) 6 mm DIAMETER
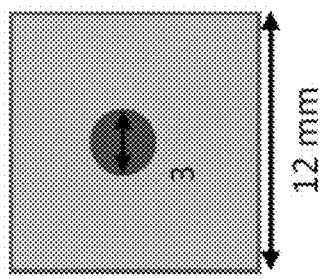
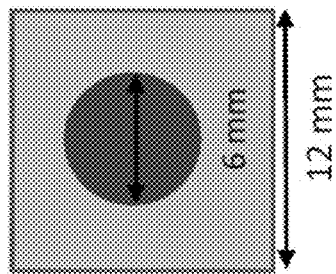

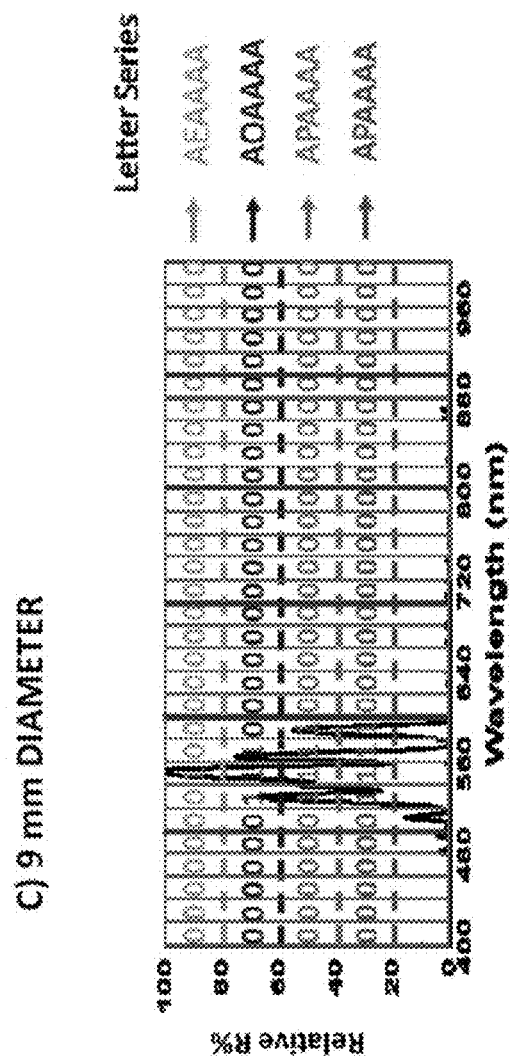
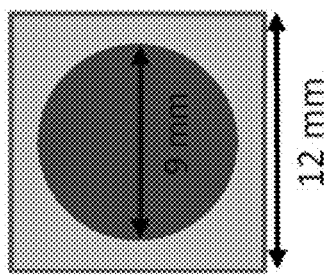
Fig. 7C

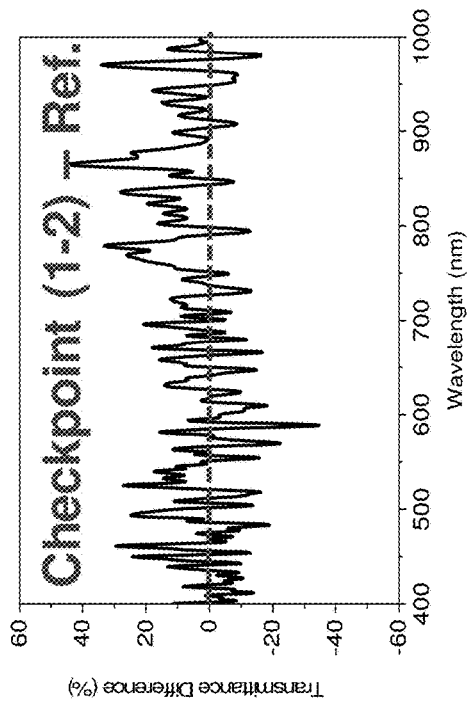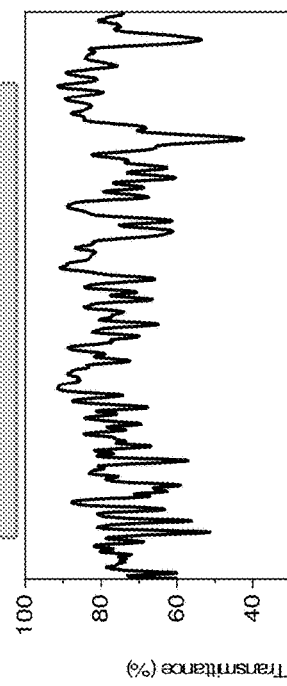
Fig. 26A

D    Summary

| 1-2 1454373569 | 2-3 2836305250 | 3-4 1202936486 | 4-5 1102937193 | 5-6 1928103210 | 6-7 1820172328 |
|---|---|---|---|---|---|
| 1-3 1279253275 | 2-4 1505620322 | 3-5 1580039281 | 4-6 2291823792 | 5-7 2019271093 | 7-1 1470891042 |
| 1-4 1598030591 | 2-5 2058328364 | 3-6 2301926282 | 4-7 2671628759 | 6-1 1520527199 | 7-2 1809117820 |
| 1-5 1380054013 | 2-6 1980273928 | 3-7 2108926374 | 5-1 1506995547 | 6-2 1676291728 | 7-3 1092163927 |
| 1-6 2097482127 | 2-7 2536292640 | 4-1 1988427836 | 5-2 1482977739 | 6-3 1362372947 | 7-4 1810192816 |
| 1-7 2248208478 | 3-1 1319168700 | 4-2 1330290198 | 5-3 1726137291 | 6-4 1728163281 | 7-5 1510239204 |
| 2-1 1872753563 | 3-2 1029318349 | 4-3 1029173942 | 5-4 1827102920 | 6-5 1901729363 | 7-6 1830197265 |
| 2-2 1638209625 | 3-3 1501926483 | 4-4 1872982718 | 5-5 1206818922 | 6-6 1912717292 | 7-7 1729033872 |

All The 49 Spetcrums Are Different From Each Other

Fig. 26D

MULTILAYERED STRUCTURES AND USES THEREOF IN SECURITY MARKINGS

RELATED APPLICATION

This application is a Continuation-in-Part of U.S. Ser. No. 16/441,982, filed Jun. 14, 2019, which claims priority from U.S. Provisional Application Nos. 62/755,947, filed Nov. 5, 2018 and 62/811,797 filed Feb. 28, 2019, the subject matter of which are incorporated herein by reference in their entirety.

GOVERNMENT FUNDING

This invention was made with government support under Grant Nos. 0423914 awarded by The National Science Foundation The United States government has certain rights to the invention.

BACKGROUND

In many industries, counterfeiting of products is a substantial problem that significantly impacts not only the revenues of original product manufacturers, but may even pose a serious threat to health and even life of consumers or operators of counterfeited, i.e., fake, products. Such safety relevant product categories include, in particular, parts for automobiles and aircraft, components for the construction of buildings or other infrastructure, food, and even medical devices and pharmaceuticals.

In order to limit counterfeiting and address such safety concerns, the industry has developed a number of different protection measures. Broadly used protection measures comprise adding a so-called security feature to a product, the feature being rather difficult to fake. For example, holograms, optically variable inks, security threads, and embedded magnetic particles are known security features which are difficult to reproduce by counterfeiters. While some of these security features are "overt", i.e., can be easily seen or otherwise recognized by a user of the product, other security features are "covert", i.e., they are hidden and can only be detected by using specific devices, such as sources of UV-light, spectrometers, microscopes or magnetic field detectors, or even more sophisticated forensic equipment. Examples of covert security features are printings with luminescent ink or ink that is only visible in the infrared part of the electromagnetic spectrum but not in its visible part, specific material compositions and magnetic pigments.

A specific group of security features, which are in particular used in cryptography, are known as "Physical Unclonable Functions" (PUFs). PUFs are sometimes also referred to as "Physically Unclonable Functions" or "Physical Random Functions". A PUF is a physical entity that is embodied in a physical structure and is easy to evaluate but hard to predict, even for an attacker with physical access to the PUF. PUFs depend on the uniqueness of their physical microstructure, which typically includes a random component that is already intrinsically present in the physical entity or is explicitly introduced into or generated in the physical entity during its manufacturing and which is substantially uncontrollable and unpredictable. Accordingly, even PUFs being produced by the exact same manufacturing process differ at least in their random component and thus can be distinguished. While in most cases, PUFs are covert features, this is not a limitation and overt PUFs are also possible.

PUFs are known in connection with their implementation in integrated electronic circuits by way of minimal unavoidable variations of the produced microstructures on a chip within given process-related tolerances, and specifically as being used for deriving cryptographic keys therefrom, e.g., in chips for smartcards or other security related chips. An example of an explanation and application of such chip-related PUFs is disclosed in the article "Background on Physical Unclonable Functions (PUFs)", Virginia Tech, Department of Electrical and Computer Engineering, 2011.

Other types of PUFs are known, such as random distributions of fibers in paper used as a substrate for making banknotes, wherein the distribution and orientation of fibers can be detected by specific detectors and used as a security feature of the banknote. In order to evaluate a PUF, a so-called challenge-response authentication scheme is used. The "challenge" is a physical stimulus applied to the PUF and the "response" is its reaction to the stimulus. The response is dependent on the uncontrollable and unpredictable nature of the physical microstructure and thus can be used to authenticate the PUF. A specific challenge and its corresponding response together form a so-called "challenge-response pair" (CRP).

In spite of intensive research, PUF implementations remain few and far between and are rarely considered in the context of high-end security architectures.

SUMMARY

Embodiments described herein relate to security markings that provide a way to effectively mark a physical object, such as a product or device, in order to verify the authenticity of the object and potentially protect the object against counterfeiting and tampering. It was found that narrowband multilayer photonic crystals can be fabricated from two or more materials having different indices of refraction using, for example, coextrusion technology. When layer uniformity within a multilayer photonic crystal structure is not achieved, the measured electromagnetic transmission or reflection spectrum and/or spectra will not conform to simple model simulations. In this case, the resulting spectrum and/or spectra will be complex and dependent on the specific layer non-uniformity at a unique location of the structure. Furthermore, due to this layer inhomogeneity, these spectrum and/or spectra will vary relative to the specific regions of the structure from which the spectrum and/or spectra can be obtained. When a complex electromagnetic transmission or reflection spectrum and/or spectra of a non-uniform multilayer photonic crystal structure is obtained and in turn electronically encoded, the resulting encryption will be unique to that specific structure from which the spectrum and/or spectra has been generated. This encryption can be electronically stored to identify a specific application or object with which the specific structure has been associated with or attached. Confirmation of that structure's application or object can then be readily made by matching a new spectrum and/or spectra obtained from that structure to that electronically, encoded, encrypted and stored. If two or more structure locations are utilized to obtain the electromagnetic transmission or reflection spectrum and/or spectra and, in turn, electronically encoded and combined, the resulting, encryption from the different locations on this structure will be further enhanced in complexity.

Accordingly, a security marking described herein can have a physically unclonable function (PUF) that includes a disordered multilayer photonic crystal structure having an electromagnetic transmission and/or reflection spectrum and/or spectra upon receipt of electromagnetic radiation within a photonic bandgap region of the structure that is unique to the structure. The structure can include layers with dissimilar indices of refraction to provide the electromagnetic transmission and/or reflection spectrum and/or spectra that is unique to the structure.

In some embodiments, the structure includes a plurality first layers of a first material and second layers of a second material that are stacked to provide a disordered or non-uniform layer structure having an electromagnetic transmission and/or reflection spectrum and/or spectra upon receipt of electromagnetic radiation within a photonic bandgap region of the structure that is unique to the structure.

In some embodiments, the first layers and second layers can be randomly stacked to provide the non-uniform layer structure. In other embodiments, the thickness of at least one of the first layers or second layers can vary between layers to provide the non-uniform layer structure.

Optionally, at least one of the first layers or second layers can include a light absorbing dye to further vary the electromagnetic spectrum and/or spectra of the structure. The light absorbing dye can be, for example, a nonlinear dye.

In still other embodiments, the first layers can include a first polymer material and the second layers can include a second polymer material. The first polymer material and/or second polymer material can include at least one of polymer, composite polymer, or a polymer blend. The first polymer material and/or second polymer material can include at least one polymer selected from the group consisting of a polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinylacetate, a polyether-amide, a styrene-acrylonitrile copolymer, a styrene-ethylene copolymer, poly(ethylene-1,4-cyclohexylenedimethylene terephthalate), an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, urethane rubber, polyoxyethylene, polyoxypropylene, and tetrafluoroethylene hexafluoropropylene vinylidene (THV).

In some embodiments, the first layers can have first refractive indices and the second layers can have second refractive indices different than the first refractive indices. The differences in the first refractive indices and the second refractive indices can be up to about 10%. At least one of the first layers or second layers can further comprise an organic or inorganic material designed to affect the refractive index or indices of the material.

In some embodiments, the structure can include a shape memory material that is capable of undergoing at least one environmentally or external stimuli (e.g., temperature, light, electricity, moisture, solvent, or magnetic field) induced shape transition from a temporary shape to a permanent shape. The shape memory material can have a first electromagnetic transmission and/or reflection spectrum and/or spectra at the temporary shape and a differing second electromagnetic transmission and/or reflection spectrum and/or spectra at the permanent shape.

In other embodiment, the structure can include at least one additional optical security features that is provided on or within the structure. The optical feature can be recognizable in incident light for further identification of the marking. The at least one additional optical feature can include, for example, a security print, a UV or IR print, a microprint, a layer containing optically variable pigment, a refractive element, a diffractive element, an anisotropic matt structure, a relief hologram, a volume hologram, a zero-order diffraction structure, or a thin-film layer element. In some embodiments, the at least one additional optical features can include at least one transmissive diffraction structure, which displays different color changing effects when the security marking is tilted and/or turned.

In other embodiments, the structure can include about 4 to about 500,000 first polymer layers and second polymer layers. The first polymer layers and second polymer layers can have thicknesses of about 5 nm to about 1 The first polymer layers and second polymer layers can be fabricated by, for example, a multilayer coextrusion forced assembly process and can be in the form of a coextruded polymer film.

Other embodiments described herein relate to a security or authentication system that includes a security marking having a PUF, which includes a multilayer photonic crystal structure as described herein. The security system can also include a device for obtaining the electromagnetic transmission and/or reflection spectrum and/or spectra within the photonic bandgap region of the structure. The device comprises electromagnetic radiation source for emitting electromagnetic radiation toward the structure and a sensor for detecting an electromagnetic radiation spectrum and/or spectra of electromagnetic radiation transmitted through and/or reflected from the structure. The system can further include a device for converting the electromagnetic transmission and/or reflection spectrum and/or spectra to a signal that is indicative of the PUF.

In some embodiments, the signal indicative of the PUF is a digital signal. The digital signal can be based on a binary question of whether or not the spectrum and/or spectra shows a peak within a spectral region over a defined wavelength.

In other embodiments, the system can also include a database in which the signal is stored and optionally retrieved for validation of the security marking.

In some embodiments, the security marking is an anti-counterfeit product marking. The security marking can be associated with an item or physical object, such as a bank note, a cheque, a bond, a bank card, a credit card, a cheque card, a currency, a money card, an identification item, an identity item, an access item, an item for granting a permission, an identification card, an identity card, a driving license, a personalized item, a passport, a product, a branded product, a consumer product, a pharmaceutical product, a health product, a nutritional product, a digital content on a data carrier, a software product on a data carrier, a document, a paper document, a security document, a personalized document, a certificate, a share certificate, a certificate of indebtedness, a contract, an insurance policy, a testament, a component, a hardware component, an electronic component, a computer chip, a book, a handbook, a postage stamp, a parking ticket, a transportation ticket, or a ticket for admission to an event.

Still other embodiments are directed to a method of providing a physical object with a security marking that has a PUF, which includes a multilayer photonic crystal structure described herein. The method can include adding a physically unclonable function (PUF) as described herein to a physical object to be marked. Electromagnetic radiation can be applied to the structure. An electromagnetic radiation spectrum and/or spectra of the electromagnetic radiation transmitted through and/or reflected from the structure can be detected. The detected electromagnetic transmission and/or reflection spectrum and/or spectra can then be converted to a signal that is indicative of the PUF.

In some embodiments, the converting step includes determining from the electromagnetic transmission and/or reflection spectrum and/or spectra at least one of: the position of one or more characteristic features within the spectra; one or more statistical measures characterizing the spectrum and/or spectra; or one or more quantized spectral values of the spectrum and/or spectra. For example, the converting step can include a binary question of whether or not the spectrum and/or spectra shows a peak within a spectral region over a defined wavelength. The signal can then be validated by comparing a characteristic of the signal with a characteristic of a signal obtained from a previous spectrum and/or spectra measurement that is indicative of the (PUF).

Other embodiments described herein relate to a method of producing a plurality of security markings. The method includes multilayer coextruding one or more polymer materials to form disordered and/or non-uniform polymer layers and multiplying the disordered and/or non-uniform polymer layers to form a film that has a randomness defined by disorder and/or non-uniformity within the film that result from the multilayer coextrusion and multiplying processes. The film can include a plurality of regions and wherein each region has an electromagnetic transmission and/or reflection spectrum and/or spectra upon receipt of electromagnetic radiation within a photonic bandgap region of the film that is unique to the region of the film.

In some embodiments, the plurality of regions can be arranged along a length and/or width of the film and each region extends the thickness of the film.

In some embodiments, the method can further include separating the regions to provide a plurality of separated film regions, wherein the plurality of separated film regions define at least a portion of the plurality of security markings.

In some embodiments, the film can include polymer layers with dissimilar indices of refraction.

In some embodiments, the multilayer coextrusion and multiplying processes can produce a plurality of first polymer layers of a first polymer material and second polymer layers of a second polymer material that are stacked.

In some embodiments, the first polymer layers and the second polymer layers are randomly stacked and/or the thicknesses of at least some of the plurality of the first polymer layers or the second polymer layers varies between the first polymer layers and the second polymer layers.

In some embodiments, at least one of the plurality of the first polymer layers or the second polymer layers can include a light absorbing dye.

In some embodiments, at least one of the plurality of the first polymer layers or the second polymer layers further include an organic or inorganic material designed to affect the refractive index of the film.

In some embodiments, the film comprises about 4 to about 500,000 first polymer layers and second polymer layers.

In some embodiments, the first polymer layers and the second polymer layers can have thicknesses of about 5 nm to about 1 μm.

In some embodiments, the film can be a multilayer polymer film.

In some embodiments, each of the plurality of security markings can include a shape memory material that is capable of undergoing at least one environmentally induced shape transition from a temporary shape to a permanent shape. The shape memory material can have a first electromagnetic transmission and/or reflection spectrum and/or spectra at the temporary shape and a differing second electromagnetic transmission and/or reflection spectrum and/or spectra at the permanent shape.

In some embodiments, the method can further include adding at least on optical security feature on or within the film, regions of the film, or plurality of security markings. Optionally, the optical feature can be recognizable in incident light.

In some embodiments, the at least one additional optical feature can include a security print, a UV or IR print, a microprint, a layer containing optically variable pigment, a refractive element, a diffractive element, an anisotropic matt structure, a relief hologram, a volume hologram, a zero-order diffraction structure, semi-reflective element, or a thin-film layer element.

In some embodiments, the at least one additional optical feature can include at least one transmissive diffraction structure which displays different color changing effects when the security markings are tilted and/or turned.

In some embodiments, the disordered and/or non-uniform layers can be formed by varying polymer layer thicknesses during the multilayer coextrusion and multiplying processes. The polymer layer thicknesses can be varied during the multilayer coextrusion and multiplying processes by varying an exit die, using uneven multipliers and/or uneven polymer layer multiplication.

In other embodiments, the polymer layer thicknesses can be varied by varying a split ratio of the uneven multipliers or an arrangement of the uneven multipliers.

Still other embodiments described herein relate to a plurality of security markings formed by the methods as described herein.

Other embodiments described herein relate to an object comprising at least one security marking formed by the methods described herein. The object can include at least one of a bank note, a cheque, a bond, a bank card, a credit card, a cheque card, a currency, a money card, an identification item, an identity item, an access item, an item for granting a permission, an identification card, an identity card, a driving license, a personalized item, a passport, a product, a branded product, a consumer product, a pharmaceutical product, a health product, a nutritional product, a digital content on a data carrier, a software product on a data carrier, a document, a paper document, a security document, a personalized document, a certificate, a share certificate, a certificate of indebtedness, a contract, an insurance policy, a testament, a component, a hardware component, an electronic component, a computer chip, a book, a handbook, a postage stamp, a parking ticket, a transportation ticket, or a ticket for admission to an event.

BRIEF DESCRIPTION OF THE DRAWINGS

FIGS. 3(A-C) are a schematic and image illustrating location and dimension of a multilayer 1-D photonic film.

FIGS. 7(A-C) illustrate UV-VIS spectra of the multilayer 1-D photonic films with relatively uneven layer thicknesses using three different UV-VIS detection diameters.

DETAILED DESCRIPTION

Figure 1:
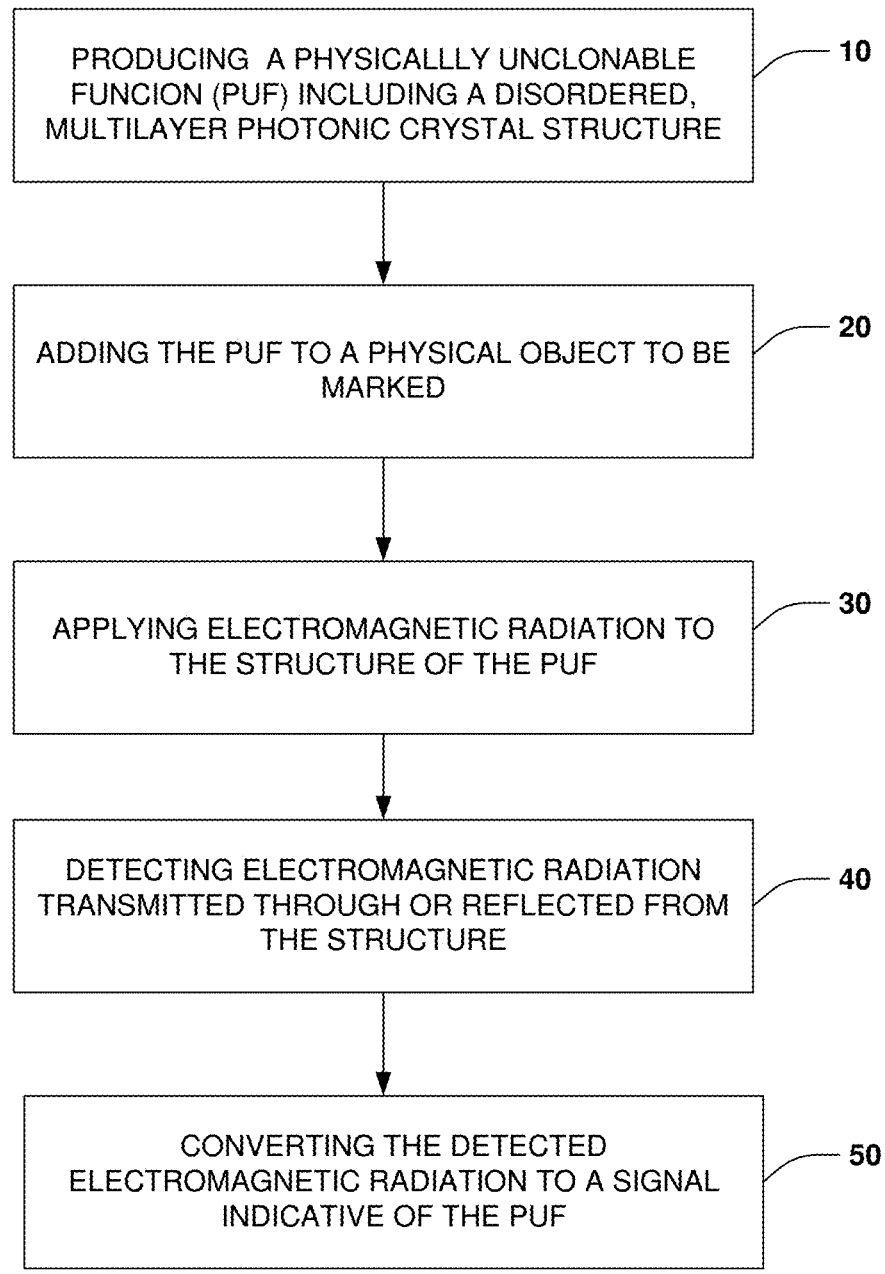
FIG. 1 is a schematic illustrating a method of providing a physical object with a security marking in accordance with an embodiment.

Embodiments described herein relate to security markings that provide a way to effectively mark a physical object, such as a product, in order to verify the authenticity of the object and potentially protect the object against counterfeiting and tampering as well as to a method of providing a physical object with a security marking. The security marking described herein has a physically unclonable function (PUF) that includes a multilayer photonic crystal structure. The structure can include a plurality first layers of a first material and second layers of a second material that are stacked to provide a disordered or non-uniform layer structure having an electromagnetic transmission and/or reflection spectrum and/or spectra upon receipt of electromagnetic radiation within a photonic bandgap region of the structure that is unique to the structure.

The security marking can be provided as a portion of a security or authentication system for effectively protecting physical objects against counterfeiting and tampering. The term "physical object", as used herein, refers to any kind of physical object, in particular to any kind of man-made product or natural object, such as a vegetable or a piece of a natural raw material. Furthermore, as used herein, the term "physical object" may also refer to a person or an animal to which a security marking may be applied. A physical object may itself comprise multiple parts, e.g., a consumable good and a packaging thereof.

The security marking can be used by a first party, e.g., an originator of a physical object in the form of a product, to protect any physical object to which the components of the marking, i.e., at least a respective PUF, can be applied. In particular, the marking can be applied to the physical object in such a way, that it cannot be separated again from the object without destroying the marking or at least parts thereof.

The PUF of the security marking is "unclonable" and thus provides a means of confirming the authenticity of the marking and, hence, the authenticity of the physical object. In order to verify the authenticity of the physical object respectively, a challenge according to a challenge-response-scheme can be applied by a second party receiving the physical object to the PUF of the physical object's marking to generate a value or signal from data representing the response received from the PUF. In some embodiments, the challenge can include electromagnetic radiation that is emitted toward the structure and the response received from the PUF can be the spectrum and/or spectra of transmitted and/or reflected electromagnetic radiation. The electromagnetic transmission and/or reflection spectrum and/or spectra can then be converted to a signal that is indicative of the (PUF). The signal can be validated by comparing a characteristic of the signal with a characteristic of a signal obtained from a previous measurement. If the signals match, this indicates that the physical object is authentic and/or the security marking has not been tampered with. Otherwise, i.e., if the signals do not match, this indicates that some sort of fraud might have happened since the originator applied the security marking to the physical object or that the physical object is fraudulent.

In some embodiments, the security marking provides an additional level of security, and thus an improved way of protecting a physical object against counterfeiting and tampering. Furthermore, as the response of the PUF to a challenge according to the challenge-response-scheme can yield/digital data, e.g., a data string, the security marking can be used to protect any physical object to which such marking can be applied, even if the object itself does not provide any digital data.

In some embodiments, the security system can also include a device, reader, or reader device for obtaining the electromagnetic transmission and/or reflection spectrum and/or spectra within the photonic bandgap region of the structure. The device comprises electromagnetic radiation source for emitting electromagnetic radiation toward the structure and a sensor for detecting an electromagnetic radiation spectrum and/or spectra of electromagnetic radiation transmitted through and/or reflected from the structure.

The system can further include a device for converting the electromagnetic transmission and/or reflection spectrum and/or spectra to a signal that is indicative of the (PUF).

Figure 2:
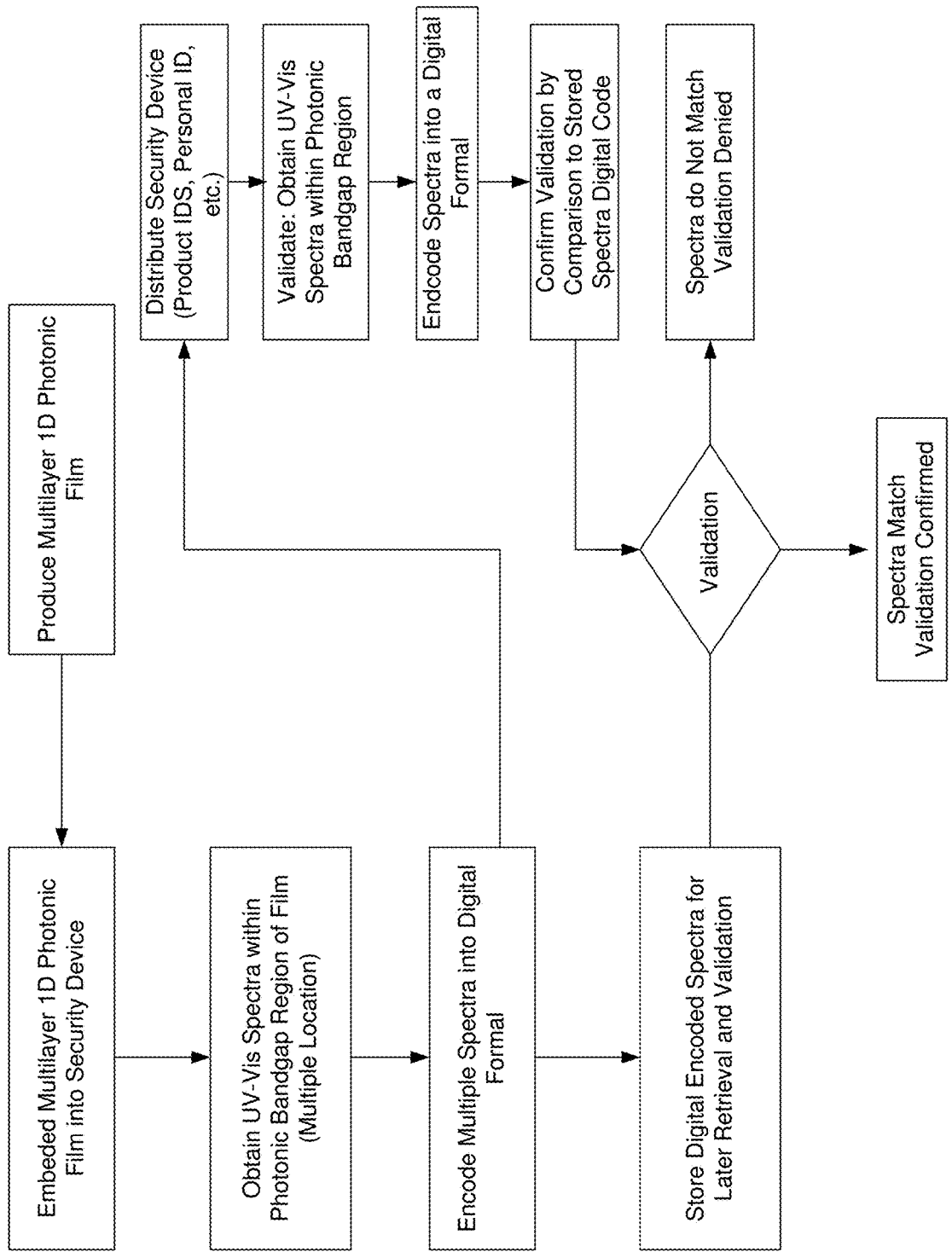
FIG. 2 is a schematic illustrating an authentication system in accordance with an embodiment.

FIGS. 1 and 2 illustrates a schematic of a method of providing a physical object or security device with a security marking and using the security marking in a security or an authentication system. In the method, at step 10, a disordered, multilayer photonic crystal structure can be produced that defines a PUF. The multilayer photonic crystal structure can include a plurality first layers of a first material and second layers of a second material that are stacked to provide a disordered layer structure having an electromagnetic transmission and/or reflection spectrum and/or spectra upon receipt of electromagnetic radiation within a photonic bandgap region of the structure that is unique to the structure.

At step 20, the PUF can be added to an object to be marked. The PUF can be added to the physical object by adhering, embossing, laminating, embedding, or attaching the PUF by any means to the physical object to be marked.

At step 30, electromagnetic radiation can be applied to the structure of the PUF. The electromagnetic radiation can be applied to the structure using, for example, an ultraviolet/visible/near infrared radiation source that emits radiation at UV, VIS, and/or NIR wavelengths. The electromagnetic radiation can be applied to one or more areas, regions, or locations of the PUF to obtain a spectrum or spectra within the photonic bandgap region of the structure at the one or more areas, regions, or locations.

At step 40, electromagnetic radiation transmitted through and/or reflected from the structure at the one or more areas, regions, or locations can be detected using a reader device, such as a UV, VIS, and/or NIR detector to obtain a spectrum and/or spectra of the detected electromagnetic radiation.

At step 50, the electromagnetic transmission and/or reflection spectrum and/or spectra can then be converted to a signal that is indicative of the PUF. In some embodiments, electromagnetic transmission and/or reflection spectrum and/or spectra can be converted to a signal by, for example, determining from the electromagnetic transmission and/or reflection spectrum and/or spectra at least one or more of the following: the position (i.e., wavelength or frequency or a related parameter) of one or more characteristic features (e.g. peaks, gaps or minima within the spectrum); (ii) one or more statistical measures characterizing the spectrum (e.g., mean, median, variance, standard deviation or other statistical moments or measures); (iii) one or more quantized spectral values of the spectrum (e.g., of the detected intensities within an intensity spectrum of the radiation); and/or (iv) a spectral barcode representing a continuous or a quantized range of allowed spectral values occurring in the spectrum, e.g., for a selected discrete subset of wavelengths. Also each of these variants may provide an increased robustness of the method against varying environmental conditions at which the response is detected. In some embodiments, conversion of the electromagnetic transmission and/or reflection spectrum and/or spectra can be a binary question of whether or not the spectrum shows a peak within a spectral region over a defined wavelength.

Optionally, as illustrated in FIG. 2, the signal can be stored for later retrieval and/or validated by comparing a characteristic of the signal with a characteristic of a signal obtained from a previous measurement. The signal obtained from electromagnetic radiation spectrum and/or spectra can be used to verify whether or not the marking, or a physical object bearing the marking has been counterfeited or tampered with.

Optionally, the security marking may comprise more than one PUF and more than one digital signature derived from a PUF, as described above. Accordingly, in a corresponding embodiment of the method, additional digital signatures may be derived either by applying different electromagnetic radiation schemes to the same PUF or by adding two or more PUFs to the object to be marked and measuring the electromagnetic radiation spectrum and/or spectra for each of these PUFs.

Figure 25:
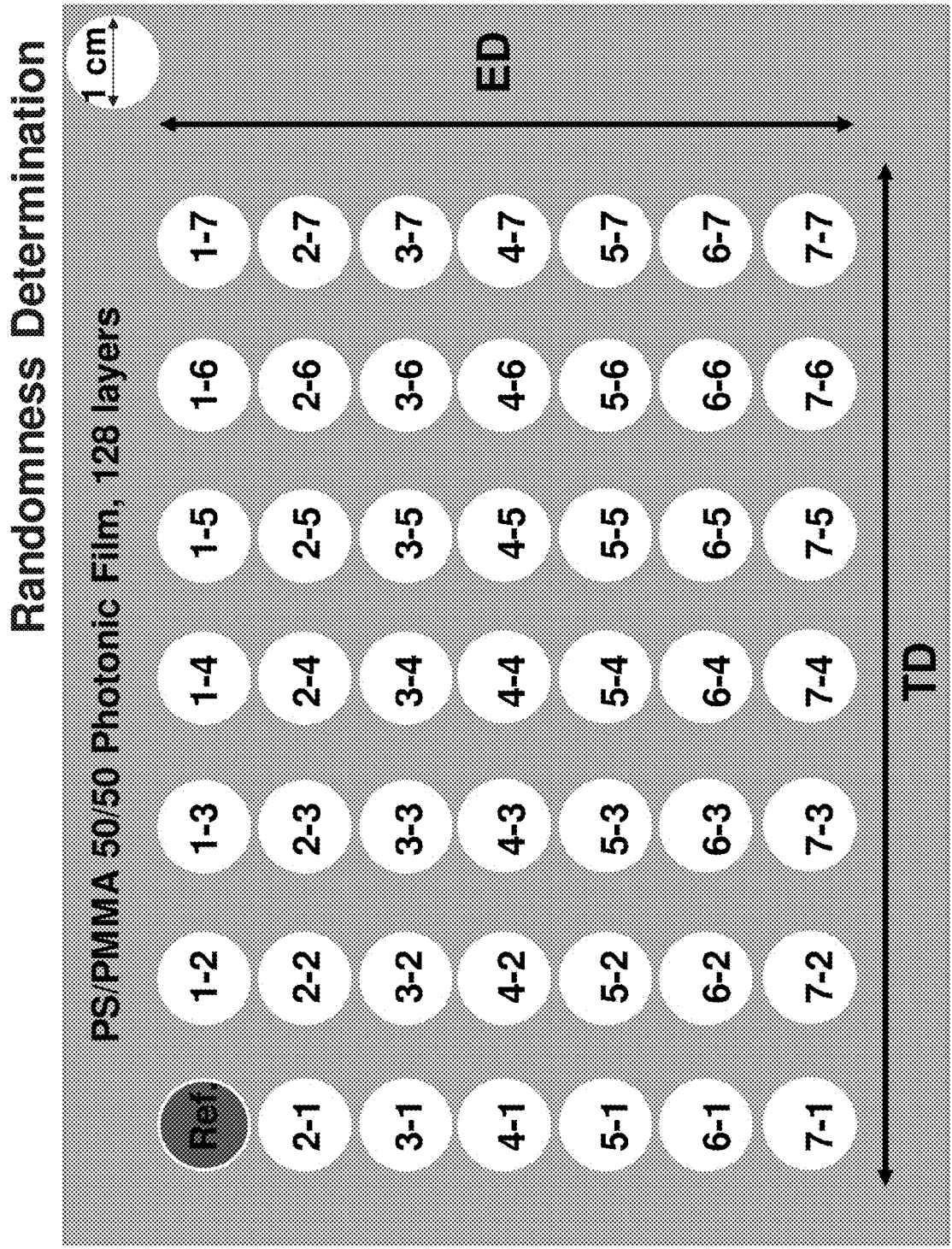
FIG. 25 illustrates a schematic showing a reference measuring point and various measuring points on a PS/PMMA multilayer 1-D photonic film.
Figure 26B:
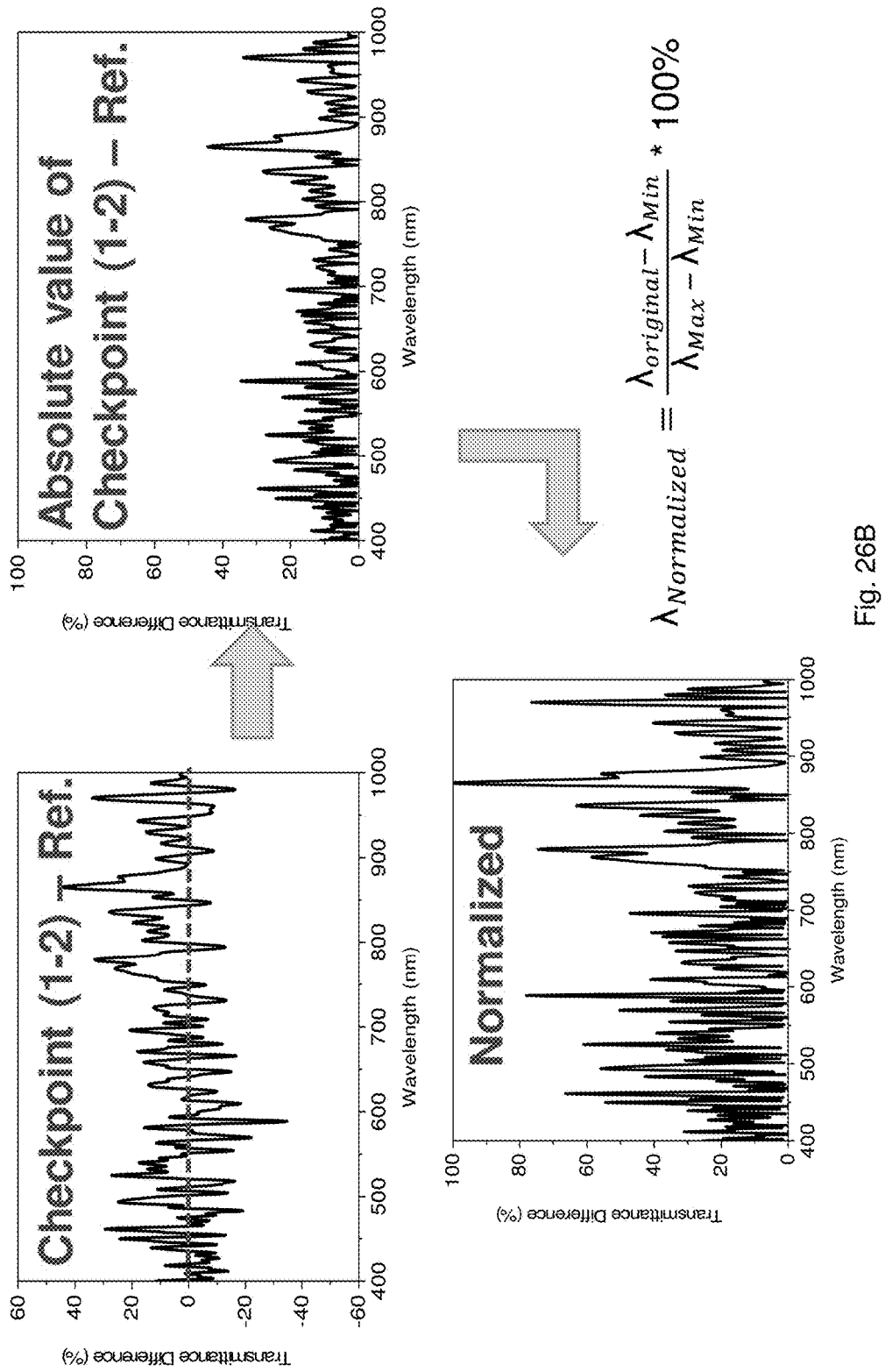
FIGS. 26(A-D) illustrate a schematic showing data processing procedure using spectrum of the reference point and spectrum of the checkpoint
Figure 26C:
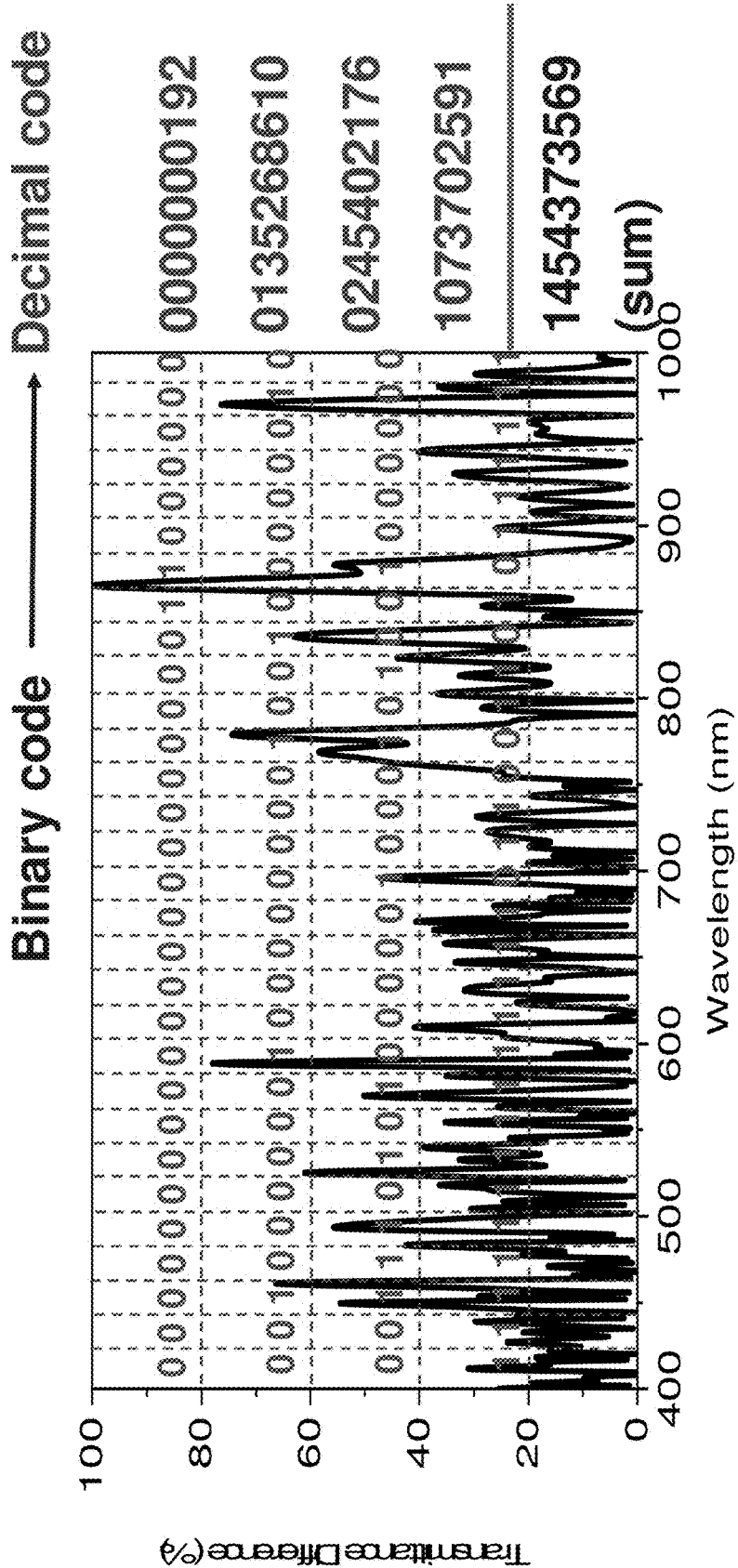

In some embodiments, as illustrated in FIG. 25, the security marking can include various PUFs defined by various graphically or spatially displaced measuring points on a security marking. Each of the PUFs can have a unique electromagnetic transmission and/or reflection spectrum based on a spatially arranged or displaced measuring point on the security marking. In some, embodiments, the spatially arranged or displaced measuring points can be provided in a grid arrangement with rows and columns of measuring points. The electromagnetic transmission and/or reflection spectrum of any one measuring point can be compared (e.g., added to, subtracted from, etc.) to the electromagnetic transmission and/or reflection spectrum of a reference point to provide a unique digital signature based on the two points. For example, FIG. 26 illustrates a data processing procedure in which the spectrum of a checkpoint or measuring point is subtracted from a reference point to provide a unique spectrum based on the two points that can be used to generate a digital signal for validating the security marking.

In some embodiments, the signal is generated in such a way that it represents at least one PUF-specific distinctive property that is, at least substantially, invariant under variations of the environmental conditions at which the electromagnetic radiation is detected. By way of example, such varying environmental conditions could be light conditions, temperature, air pressure or other parameters or properties of the environment to which the PUF is typically exposed during detecting by a reader device. An advantage of this embodiment is an increased robustness of the method of detecting and a detection device used therefore with respect to their capability of correctly detecting or reading an electromagnetic radiation spectrum and/or spectra comprising a corresponding PUF. This enables an even more reliable distinction between counterfeited or tampered markings and physical objects bearing such markings on the one hand, and markings/objects that have not been counterfeited or tampered with on the other hand.

In some embodiment, the method further comprises an acquisition step, wherein a security marking comprising a PUF is detected or read, and a digital signature is acquired from the marking by a reader device. A representation of the acquired digital signature, and/or a matching output, according to at least one predetermined matching criterion, can be provided to indicate whether the acquired digital signature matches a predetermined matching signature. In this way, the method provides a verification of the authenticity of the marking, respectively of the physical object bearing the marking by allowing for a comparison, e.g., by user, between the digital signature comprised in the marking on the one hand, and a corresponding representation of information contained in the response of the PUF of the marking on the other hand.

In other embodiments, the method can further include a communication step, wherein a reading result is communicated over a communication link to an opposing side. Particularly, the communication step might be adapted for sending and receiving data over a wireline, wireless, or optical communication link, such as a communication link based on, for example, wireless LAN, Bluetooth, cellular network or a classical telephone line. Such communication link may be used for a variety of different purposes, including for sending acquired information, e.g., a digital signature acquired in an acquisition step, to an validation side or party, which can, for example, be a central security instance, such as a trust center comprising a central security server, which can form a component of a security solution.

According to a further embodiment, the communication step further comprises capturing and sending security-related information to a predetermined party over the communication link. In particular, such sending of security-related information may occur randomly, or may be specifically triggered according to a predetermined trigger scheme or remotely, e.g., by the party. This allows for a remote monitoring of the security status of the reader device itself, and/or of security-related events the reader device is involved in. Such a security-related event might for example be a detection of a marking/object that has been counterfeited or tampered with, according to the output generated in the acquisition step or other security-related information provided by the reader device.

In other embodiments, the method can further include a storage step, wherein a digital signature obtained from detecting or reading the electromagnetic radiation spectrum and/or is stored into a block of a blockchain. This enables a secure, reliable storage of the reading results with very high data integrity, such that it is essentially impossible to manipulate or erase or otherwise tamper with or lose such data, e.g., due to unintended or deliberate deletion or due to data corruption. Thus, the complete reading history remains available. Furthermore, the stored information can be accessed wherever access to the blockchain is available. This allows for a safe and distributed storage and access to the stored reading results, e.g., for integrity verification purposes, such as checking whether a supplier of a product being marked with a security marking, as described herein, was in fact the originator of the product, or not. Based on this embodiment, the physical world, to which the marked objects and the markings themselves belong, can be connected to the blockchain technology. Thus, a high degree of traceability of the origin and supply chain of physical objects, such as products, can be achieved.

According to a further embodiment, the storage step can include storing a first reading result that includes data representing the digital signature generated into a block of a first blockchain; and storing a second reading result obtained in the acquisition step, into a block of a second blockchain being separate from the first blockchain. This allows for storing and thus saving both the first and second reading results, i.e. the one being derived from reading the PUF and the one being read from the second digital signature, into a blockchain, thus providing the advantages discussed in connection with the immediately preceding embodiment. Using different blockchains for the two different reading results further provides the advantage of easily supporting a combination of an existing (second) supply chain for the second reading results with an additional first supply chain, for the first reading results related to the responses of the PUFs. Accordingly, different access rights can be easily enabled and the management of the blockchains can be in the hands of different authorities. In particular, this embodiment can be used to verify whether (i) a supplier of a product was in fact its originator, and (ii) whether the supply chain was as expected, or not.

In some embodiments, the unique electromagnetic transmission and/or reflection spectrum and/or spectra of the disordered layer structure of the PUF can depend on irregularities of the structure resulting from non-uniform or disordered layers of the multilayer photonic crystal structure. The irregularities can be caused random variations and/or characteristics in at least some of the first layers and second layers that occur in the fabrication process, which are easy to measure, but prohibitively difficult to duplicate and/or to clone and/or to control during fabrication. Such irregularities are specific and individual to each multilayer photonic crystal structure that is fabricated. They differentiate any two structures and hence any two objects to which a security marking, which includes the structure, from one another. This holds even if the two multilayer photonic crystal structures have been fabricated by nominally identical fabrication procedures. It is prohibitively difficult to clone or duplicate the irregularities of a first multilayer photonic crystal structure with irregularities in a second multilayer photonic crystal structure, even for the manufacturer of the first object.

In some embodiments, the irregularities of the non-uniform or disordered layers can include in homogeneities, manufacturing variations, imperfections, randomness, or disorder that occur in the first layers, second layers, and/or during the fabrication of the structure. They may include and/or affect the position, orientation, spectral characteristics, intensity characteristics, shape, size, inner state, inner composition, time-dependent behavior, luminescence characteristics or other features of layers within the structure. The irregularities may occur naturally in certain fabrication processes. Also, the fabrication process can be designed in such a way as to maximize the occurrence of or the occurring of irregularities.

In certain embodiments, the disordered or non-uniform layer structure can result, for example, from randomly stacking the first layers and the second layers. In other embodiments, the thickness of at least some of the first layers or second layers can vary between the layers to provide the disordered or non-uniform layer structure.

In some embodiments, the disordered or non-uniform multilayer photonic crystal structure can be made of at least two alternating first polymer layers of a first polymer material and second polymer layers of a second polymer material that are stacked. One of ordinary skill in the art will readily appreciate that a wide variety of polymer materials can be used to form the multilayer structure described herein. The first polymer material used to form the first polymer layers and the second polymer materials used to form the second polymer layers can be chosen to be substantially optically transparent and have a difference in the index of refraction of the layers, for example, on the order of from 0 to 10%, including any increments within that range, for example, on the order of 0 to 2%.

In some embodiments, the degree of index matching is chosen to provide the desired initial level of reflectivity and to maximize the change in reflectivity with a nonlinear index. By way of example, the index matching for polycarbonate (PC) with a refractive index $n_0=1.583$, is for the alternate layers to be matched to within 0.004 with a nonlinear layer having the smaller index.

The first polymer material and the second polymer material described herein can include any polymer material having a weight average molecular weight (Mw) of at least 3,000. The polymer material can be a polymer material formed from one or more polymers and/or a composite material that includes one or more polymers and at least one or more additional materials dispersed therein. The additional material can be another polymer material or an inorganic material with different physical and/or chemical properties than the one or more polymer materials such that when combined, the composite material has characteristics different than the individual components.

Examples of inorganic materials include inorganic fillers, such as glass, titanium dioxide and talc. The inorganic material may be in the form of, for example, particles, rods, fibers, plates. The composite material similar to the polymer material can be substantially optically transparent. Accordingly, the dispersed material can be miscible with the polymer materials and have a refractive index substantially the same with the polymer material or is finely dispersed to avoid light scattering. Such composite materials are a convenient and useful way to control the linear part of the refractive index in the individual layers.

Polymer material that can be used as the first polymer material and/or second polymer material can include polyethylene naphthalate and isomers thereof, such as polyethylene naphthalate; polyalkylene terephthalates, such as polyethylene terephthalate, polybutylene terephthalate, and polycyclohexanedimethylene terephthalate; polyimides, such as polyacrylic imides; polyetherimides; styrenic polymers, such as atactic, isotactic and syndiotactic polystyrene (PS); polycarbonates, such as bisphenol-A-polycarbonate (PC) and high glass transition temperature polycarbonate (HTPC); poly(meth)acrylates, such as poly(isobutyl methacrylate), poly(propyl methacrylate), poly(ethyl methacrylate), poly(methyl methacrylate) (PMMA), poly(butyl acrylate) and poly(methyl acrylate) (the term "(meth)acrylate" is used herein to denote acrylate or methacrylate); cellulose derivatives, such as ethyl cellulose, cellulose acetate, cellulose propionate, cellulose acetate butyrate, and cellulose nitrate; polyalkylene polymers, such as polyethylene, polypropylene, polybutylene, polyisobutylene, and poly(4-methyl)pentene; fluorinated polymers, such as perfluoroalkoxy resins, polytetrafluoroethylene, fluorinated ethylene-propylene copolymers, polyvinylidene fluoride (PVDF), and polychlorotrifluoroethylene; chlorinated polymers, such as polydichlorostyrene, polyvinylidene chloride and polyvinylchloride; polysulfones; polyethersulfones; polyacrylonitrile; polyamides; polyvinylacetate (PVAC); polyether-amides, thermoplastic polyurethanes (e.g., PELLETHANE TPU), and copolymers thereof.

The copolymers can include, for example, styrene-acrylornitrile copolymer (SAN), containing between 10 and 50 wt %, preferably between 20 and 40 wt %, acrylonitrile, styrene-ethylene copolymer; and poly(ethylene-1,4-cyclohexylenedimethylene terephthalate) (PETG). In addition, each individual layer may include blends of two or more of the above-described polymers or copolymers.

In some embodiments, the multilayer photonic crystal structure, layers of the structure, and/or polymer materials used to form the layers can exhibit a nonlinear optical response to the received electromagnetic radiation. The nonlinear optical response denotes that the real and/or the imaginary part of the refractive index of the structure, layers, and/or material is a function of the intensity and/or fluence of the incident light. Specifically, either the absorbance and/or the refractive index varies with the fluence (intensity). For an optical limiter, a dye with a nonlinear optical response that includes an absorbance that can increase with fluence (intensity) is particularly useful. Further, the multilayer photonic crystal structure can be a 1D photonic crystal in the sense that a photonic crystal is a material having a spatially periodic modulation of the refractive index.

Figure 16:
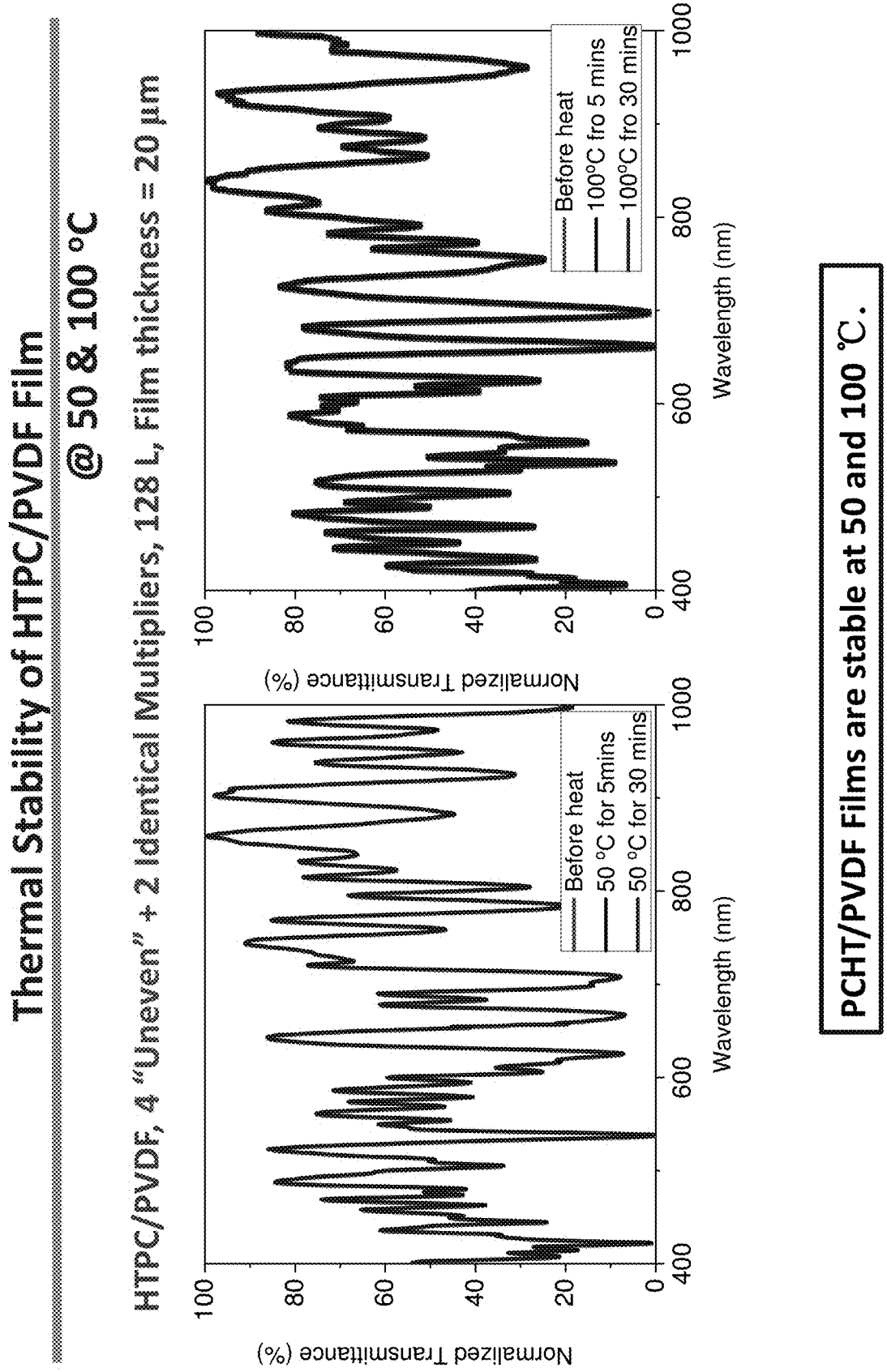
FIG. 16 illustrates the UV spectra of a multilayer 1-D photonic HTPC/PVDF film in transmission mode at 50° C. and 100° C.
Figure 17:
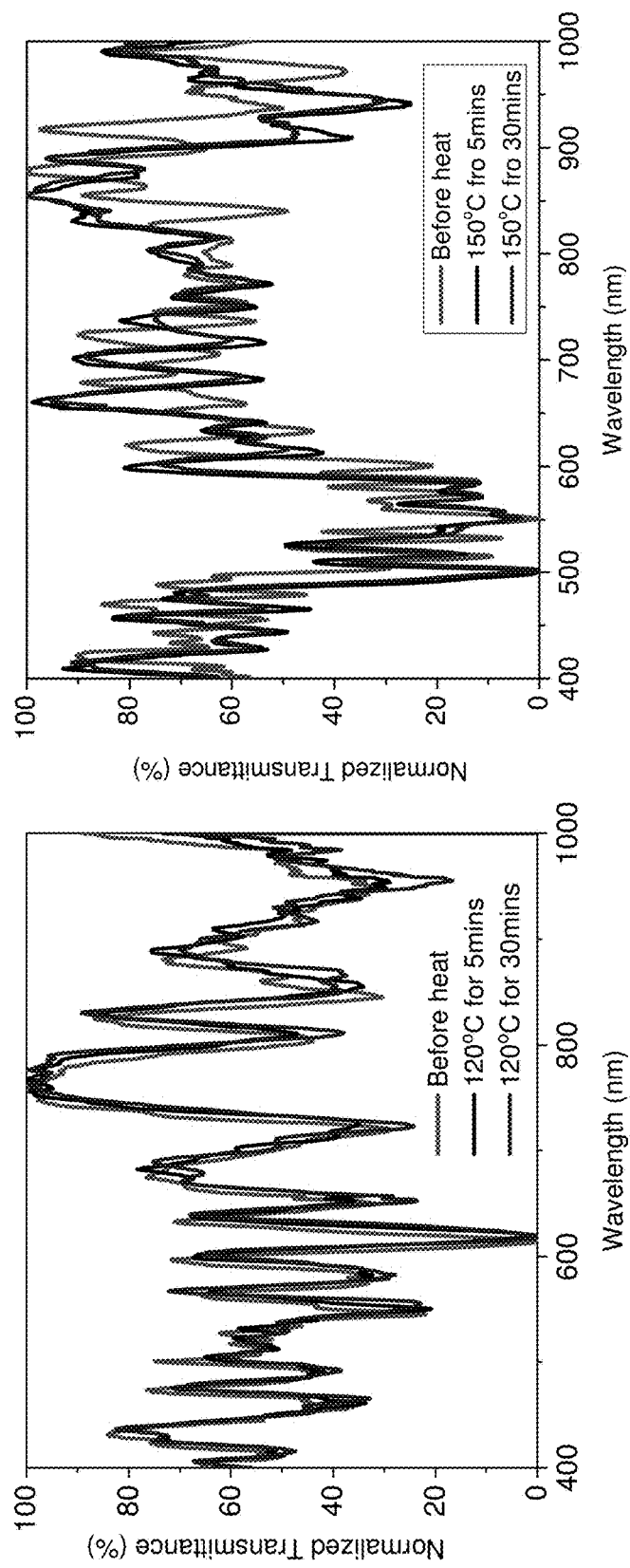
FIG. 17 illustrates the UV spectra of a multilayer 1-D photonic HTPC/PVDF film in transmission mode at 120° C. and 150° C.
Figure 18:
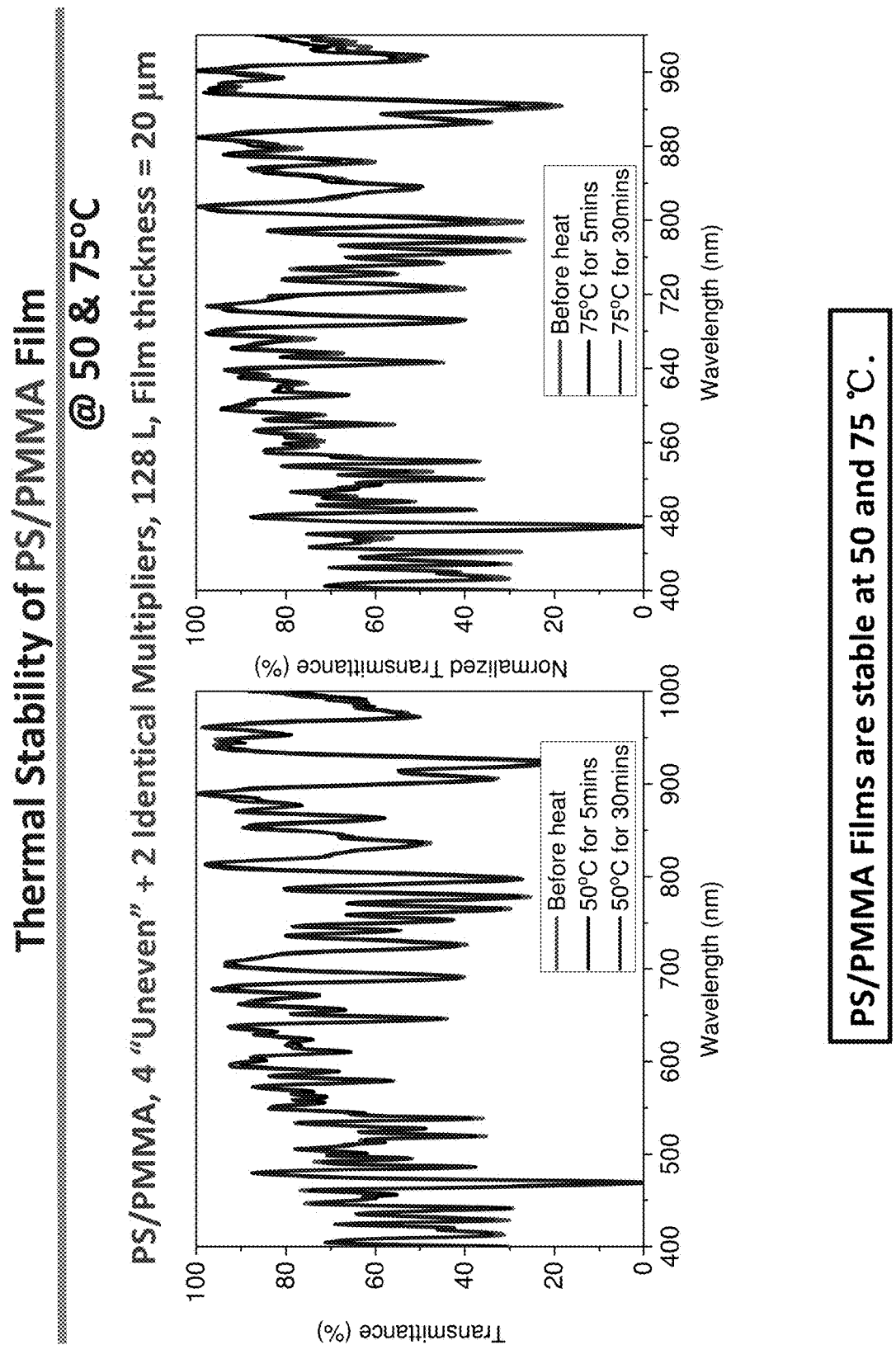
FIG. 18 illustrates the UV spectra of a multilayer 1-D photonic PS/PMMA film in transmission mode at 50° C. and 75° C.
Figure 19:
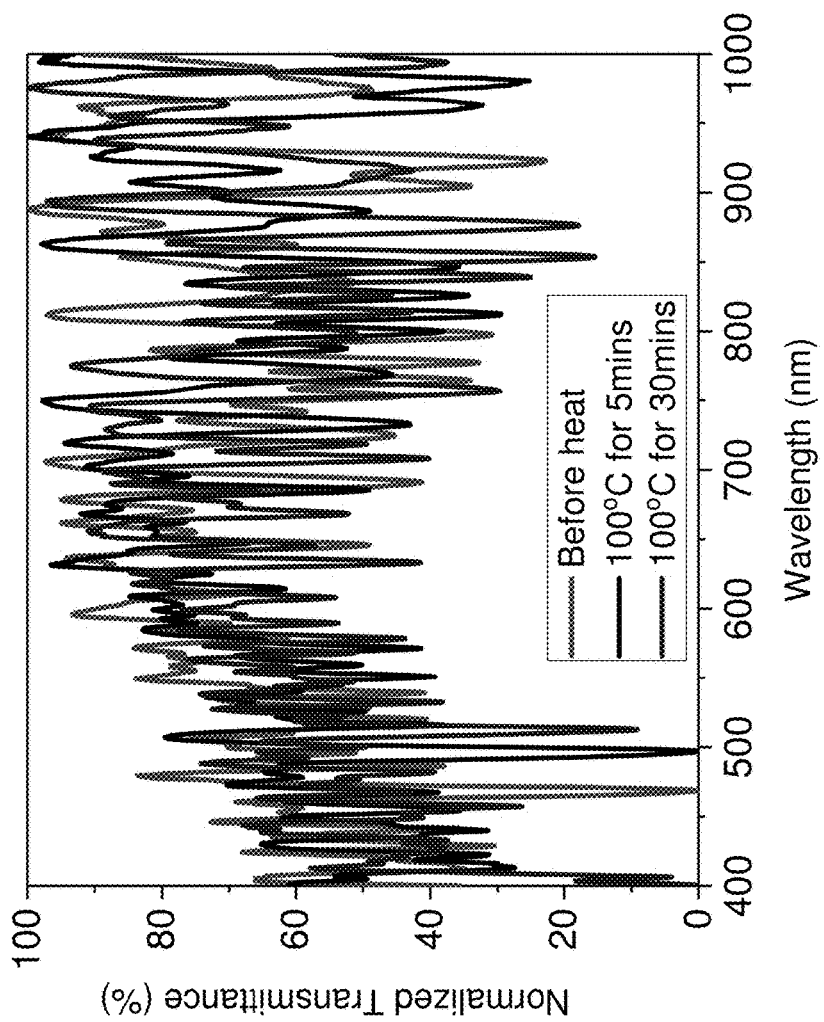
FIG. 19 illustrates the UV spectra of a multilayer 1-D photonic PS/PMMA film in transmission mode at 100° C.

In some embodiments, the first layers and second layers and/or the first polymer material and the second polymer material can be thermally stable such that the electromagnetic transmission and/or reflection spectrum and/or spectra of the multilayer photonic crystal structure is maintained upon exposure to increased or decreased temperatures over a defined range and degrades once the security marking is exposed to a temperature outside of the defined range, such as an elevated temperature above the glass transition or melting temperature of the material forming the first layer and the second layer and/or the first polymer material and the second polymer material. Polymer materials can be selected such that the mechanical and chemical integrity and hence the electromagnetic transmission and/or reflection spectrum and/or spectra of the multilayer photonic crystal structure is maintained at decreased or elevated temperatures over the defined range and degrades upon exposure to a temperature outside the defined range. For example, FIGS. 16 and 17 show the electromagnetic transmission spectrum and/or spectra of a multilayer 1-D photonic HTPC/PVDF film was maintained at temperatures from 50° C. to 100° C., but degraded at temperatures of 120° C. to 150° C. FIGS. 18 and 19 show the electromagnetic transmission spectrum and/or spectra of a multilayer 1-D photonic PS/PMMA film was maintained at temperatures from 50° C. to 75° C., but degraded at a temperature of 100° C. Thus, the polymer material can be selected depending on the temperature range to which the film is exposed.

Security markings that include thermally stable polymer materials can be used in applications where it is desirable to monitor the integrity of a product upon exposure to varying temperatures. For example, a temperature sensitive pharmaceutical can include a security marking that exhibits a change of electromagnetic transmission and/or reflection spectrum and/or spectra upon exposure of the marking and the pharmaceutical to a predetermined temperature outside the defined range. The electromagnetic transmission and/or reflection spectrum and/or spectra can used to determine if the marking and pharmaceutical are exposed to adverse or damaging temperatures and hence whether the safety of the pharmaceutical has been compromised. Other applications can include food packaging and/or motor vehicle components to which the security marking can be applied to determine if the security markings of the food packaging and/or motor vehicle component are exposed to temperatures sufficient to damage the food or motor vehicle component.

In other embodiments, the multilayer photonic crystal structure can include a shape memory material that is capable of undergoing at least one environmentally or external stimuli (e.g., temperature, light, electricity, moisture, solvent, or magnetic field) induced shape transition from a temporary shape to a permanent shape. The shape memory material can have a first electromagnetic transmission and/or reflection spectrum and/or spectra at the temporary shape and a differing second electromagnetic transmission and/or reflection spectrum and/or spectra at the permanent shape. Advantageously, forming a multilayer photonic crystal structure with differing first and second electromagnetic transmission and/or reflection spectrum and/or spectra allows security markings to be formed that is environmentally sensitive (e.g., temperature, light, electricity, moisture, solvent, or magnetic field) and be used to monitor the integrity of a product upon exposure to varying environmental or external stimuli (e.g., temperature, light, electricity, moisture, solvent, or magnetic field). For example, a temperature sensitive security marking can exhibit a shape transition that results in a change of electromagnetic transmission and/or reflection spectrum and/or spectra upon exposure of the marking product to which it is applied to a predetermined adverse or damaging temperature. This allows precise monitoring of the integrity of a product in response to a defined or predetermined threshold temperature and if the product has been exposed to the adverse or damaging temperature.

In some embodiments, the shape memory material of the multilayer photonic crystal structure includes at least a first polymer layer and a second polymer layer. The first polymer layer is formed from a first polymer that has a first glass transition temperature and first melt temperature. In some embodiments, the first polymer layer can define a hard segment of the shape memory material that provides the shape memory material with the permanent memory shape. The second polymer layer is formed from a second polymer material that has a second glass temperature and second melt temperature that is different than the melt temperature and/or glass transition temperature of the first polymer material. In some embodiments, the second polymer layer can define the switching segment of the shape memory material that produces the temporary shapes of the shape memory material. The first polymer layer and the second polymer layer can define discrete nanoscale or microscale polymer domains (e.g., hard, crystalline, switching, and/or amorphous domains) that are on the same size scale as the phase separated domains (e.g., hard, crystalline, switching, and/or amorphous domains) in known shape memory polymers. This allows the shape memory material to have a first electromagnetic transmission and/or reflection spectrum and/or spectra at the temporary shape a second electromagnetic transmission and/or reflection spectrum and/or spectra at the permanent shape.

Figure 20:
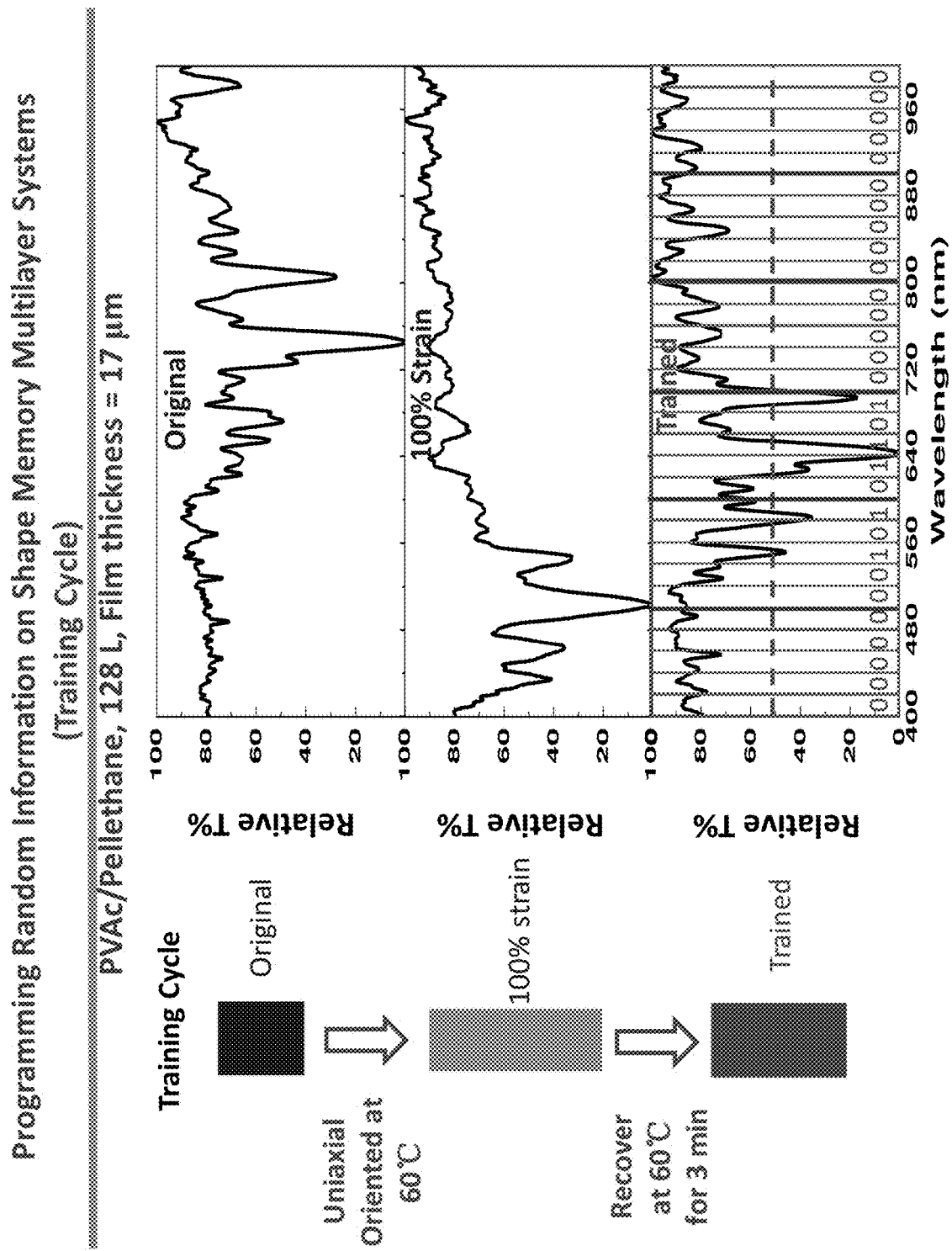
FIG. 20 illustrates a schematic and UV spectra of a multilayer 1-D photonic PVAc/Pellethane shape memory film undergoing training.
Figure 21:
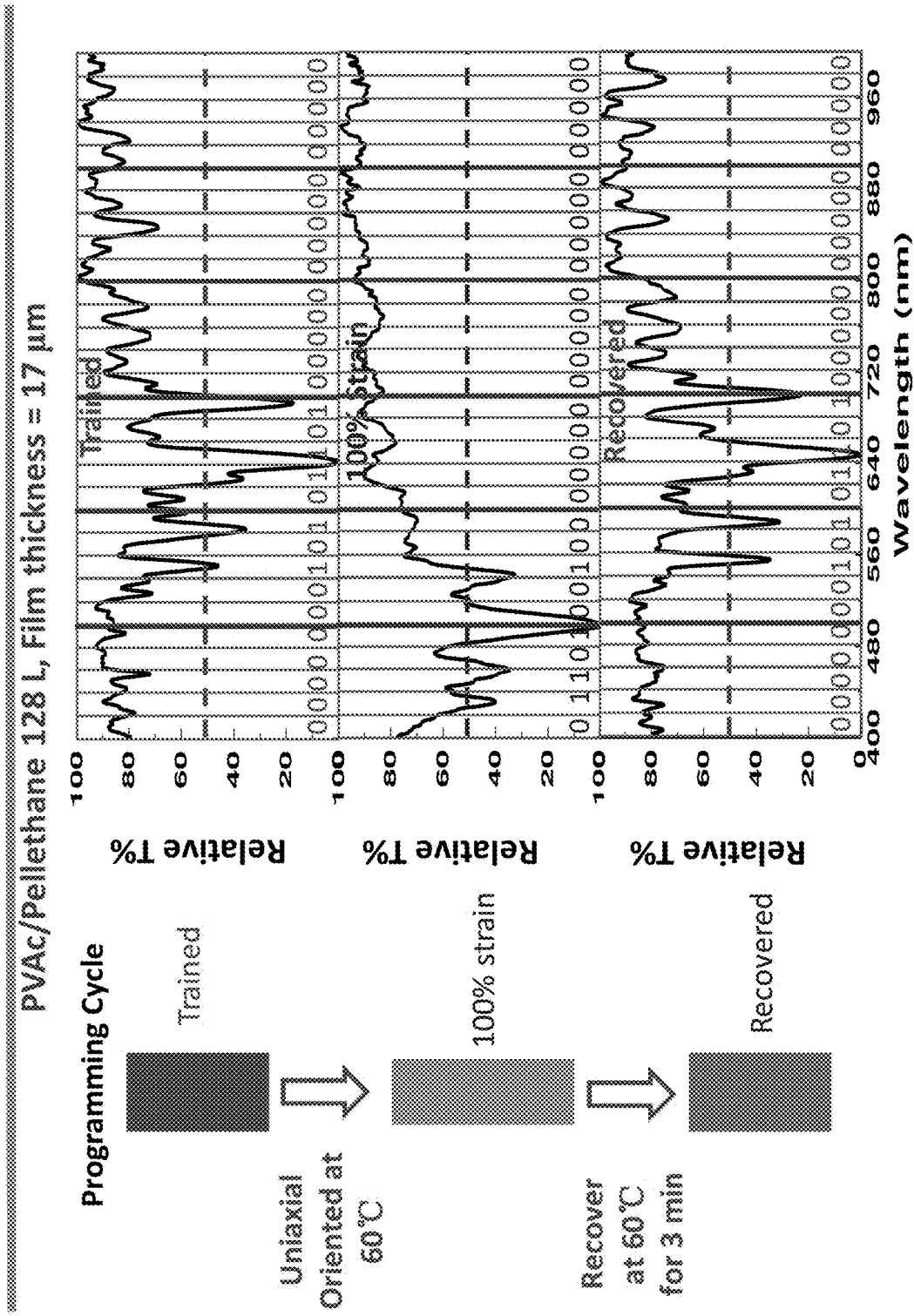
FIG. 21 illustrates a schematic and UV spectra of a multilayer 1-D photonic PVAc/Pellethane shape memory film undergoing programming.

By way of example, FIGS. 20-21 illustrate a schematic and UV spectra of a multilayer 1-D photonic PVAc/Pellethane shape memory film undergoing training and subsequent programming from a permanent to a temporary shape. The shape memory material has a first electromagnetic transmission and/or reflection spectrum and/or spectra at the temporary shape a second electromagnetic transmission and/or reflection spectrum and/or spectra at the permanent shape.

In some embodiments, the first glass transition temperature and/or first melt temperature of the first polymer material can be different from, respectively, the second glass transition temperature and/or second melt temperature of the second polymer material such that a polymeric composite is formed comprising the first polymer layer and second layer, which exhibits shape memory behavior. For example, the polymeric composite shape memory material when provide in the form of a film, strand, or other structure, can exhibit at least two shape positions, one of which is the distinct permanent shape and the other, which is the temporary or fixed shape. The temporary or fixed shape forms or diminishes at a thermal transition, such as a glass transition and/or melting transition that is defined by or determined by the glass transition temperatures and/or melt temperatures of the first polymer material and the second polymer material. Temporary shapes are achieved by exposing the shape memory material to an external stimulus, such as heat, causing either the first polymer or the second polymer to exist above its transition temperature, either in an amorphous, elastomeric, or melted state. Deformation while in the amorphous, elastomeric, or melted state and subsequent cooling below the transition temperature, while under an applied stress, fixes the temporary shape through vitrification or crystallization of the amorphous, elastomeric, or melted state of the first polymer material or second polymer material. Subsequent exposure to an external stimulus can causes the composite shape memory material to return to the original permanent shape. Both films and strands produced using the polymeric composite shape memory material can demonstrate good shape fixing, as well as 100% shape recovery upon a thermal stimulus.

In some embodiments, the first polymer layer is elastic to provide mechanical recovery and the second polymer layer is reversibly crosslinked, physically or chemically, to allow freezing of temporary shapes for use in various applications. Alternatively, the second polymer layer can be elastic to provide mechanical recovery and the first polymer layer can be reversibly crosslinked, physically or chemically, to allow freezing of temporary shapes for use in various applications.

In other embodiments, the first polymer layer can be a hard layer that is typically crystalline, with a defined melting point, and the second polymer layer can be a soft switching layer that is typically amorphous, with a defined glass transition temperature. Alternatively, the second polymer layer can be a hard layer that is typically crystalline, with a defined melting point, and the first polymer layer can be a soft layer that is typically amorphous, with a defined glass transition temperature. In some embodiments, however, the hard layer(s), whether the first polymer layer or the second polymer layer, can be amorphous and have a glass transition temperature rather than a melting point. In other embodiments, the soft layer(s), whether the first polymer layer or the second polymer layer, can be crystalline and have a melting point rather than a glass transition temperature. The melting point or glass transition temperature of the soft layer(s) can be substantially less than the melting point or glass transition temperature of the hard layer(s).

The first polymer material used to form the first polymer layer and the second polymer material used to form the second polymer layer can include any polymer that can be melt extruded and form a composite shape memory material. The first polymer material and the second polymer material should be selected such that their glass transition temperatures and/or melt temperatures differ and that upon melt extrusion form a composite of the first polymer layer and second polymer layer, which exhibits shape memory properties. The first polymer material can be immiscible or partially miscible with the second polymer material when coextruded so as to form discrete layers in the composite shape memory material. It will be appreciated that one or more additional layers formed from the first polymer material or the second polymer material or a different polymer materials may be provided to produce the polymeric shape memory material.

In some embodiments, the first polymer material and the second polymer material are not shape memory polymers, i.e., the first polymer material and the second polymer material when individually or separately formed into structures do not exhibit shape memory properties. It is the differing properties (e.g., glass transition temperature, melt temperature, and crystallinity) of the polymers, which are used to from the at least first polymer layer and second polymer layer, that provide the composite shape memory described herein with its shape memory behavior or properties. This allows selection of a broader range of polymers to form the composite shape memory material than has been used to form shape memory materials with shape memory polymers. It will be appreciated though that at least the first polymer material or second polymer material could potentially be a shape memory polymer.

In other embodiments, at least one of the first material or second material can include a light absorbing dye to vary the electromagnetic spectrum and/or spectra of the structure. The light absorbing dye can be provided in single layer of the multilayer structure or in multiple layers of the multilayer structure. The dye can be provided at amount or content to provide the multilayer film with a disordered or non-uniform layer structure. The content of the dye in the at least one of the first material or second material can be, for example, about 0.1 wt. % to about 5 wt. %.

The light absorbing dye can be, for example, a nonlinear dye. The nonlinear dye can be a material whose dielectric constant and hence the refractive index varies with the incident light intensity and/or the incident light fluence. The intensity or fluence dependence can be in either or both the real or imaginary part (absorptive part) of the refractive index. Nonlinear dyes can be used to confer nonlinear absorption, nonlinear refraction or both on the polymer materials and polymer composites used in the multilayer structure. Nonlinear dyes can also be used to enhance the nonlinear optical response of polymers with an inherent nonlinear optical response. The nonlinear absorption property is obtained by using nonlinear dyes that exhibit reverse saturable absorption, sequential two-photon absorption, or two-photon absorption with sequential two-photon absorption or reverse saturable absorption being preferred. Nonlinear dyes exhibiting this property include phthalocyanines, naphthalocyanines, porphyrins, organometallic cluster compounds, and fullerenes. Examples of such dyes are lead tetrakis(cumylphenoxy)phthalocyanine (PbPc(CP)$_4$), lead tetrakis(polydimethylsiloxane) phthalocyanine, tetra-tert-butyl (para-trifluoromethyl phenyl)indium(III) phthalocyanine and bis(trihexylsiloxy)silicon naphthalocyanine.

In some embodiments, a nonlinear refraction property can be obtained by using nonlinear dyes or materials that exhibit an intensity dependent refractive index. The intensity dependent refractive index can be obtained by thermal expansion in a material by optical pumping to an excited state where the excited state has a different refractive index from the ground state. Nonlinear dyes exhibiting these properties include nigrosine, cyanines, phthalocyanines, naphthalocyanines, porphyrins, organometallic cluster compounds, carbon blacks and fullerenes. The host materials can include polymers, such as polycarbonates, polystyrenes, poly(methyl)methacrylate and polysiloxanes. The thermal nonlinearity is enhanced by the peripheral substituent on the nonlinear dye. For a thermal nonlinearity, nigrosine, and copper tetrakis(cumylphenoxy)phthalo-cyanine can be used. For an optical pumping nonlinearity, the nonlinear dyes can include lead tetrakis(cumylphenoxy)phthalocyanine (PbPc(CP)$_4$), lead tetrakis(polydimethylsiloxane) phthalocyanine or the equivalent bis(trihexylsiloxy)-silicon naphthalocyanines.

In some embodiments, a multilayer polymeric photonic crystal structure, such as a 1-D photonic crystal structure, can be fabricated using polymer materials described herein in a multilayer extrusion process. The process can yield a flexible large film or sheet having a multilayer polymeric photonic crystal structure. The thickness of the individual layers can be from about 5 nanometers to about 10 micrometers, for example from about 10 nanometers to about 1000 nanometers, from about 30 nanometers to about 200 nanometers, or from about 50 nm to about 150 nm. The layers can be engineered to provide reflectivity within a wavelength region between about 200 micrometers (Far Infrared) and the near UV (100 nanometers). In other words, there should be a transmission window somewhere between 200 micrometers and 100 nanometers. The polymeric materials used in the alternating layers can be transparent in the above region. At least one of the layers can have a thickness and/or structure that is varied or chirped compared to the other layers to provide a disordered or non-uniform structure. The layer thickness can be varied or chirped to provide variable reflectivity over a broad band of wavelengths and acceptance angles. The remaining layers can have a substantially uniform layer thickness, where "substantially" is used to denote a deviation within 20%.

In one example, the multilayer structure can be made of two alternating layers (ABABA . . . ) of two polymer materials referred to as component "(a)" and component "(b)", respectively. The components (a) and (b), may be the same or different and form a multilayer structure represented by formula $(AB)_x$, where $x=(2)^n$, and n is the number of multiplier elements. In some embodiments, least one of components (a) and (b) or a layer formed there can exhibit a nonlinear optical response. It should be understood that the multilayer structure may include additional types of layers. For instance, a three component structure of alternating layers (ABCABCA . . . ) of components (a), (b) and (c) is represented by $(ABC)_x$, where x is as defined above.

In the two-alternating layer system described above one of the alternating layers (A) comprises component (a) which is a first polymer material and a second alternating layer (B) comprises component (b) which is a second polymer material different than the first polymer material. It can be desirable to adjust the composition so that the difference between the linear index of the first polymer layers form from the first polymer material and the linear index of the second polymer layers formed from the second polymer material is between 0 and about 10% including any increments therein, for example, between 0 and about 2%. The multilayer structure in the above embodiment is represented by formula $(AB)_x$, where $x=(2)^n$, and n is the number of multiplier elements.

Figure 14:
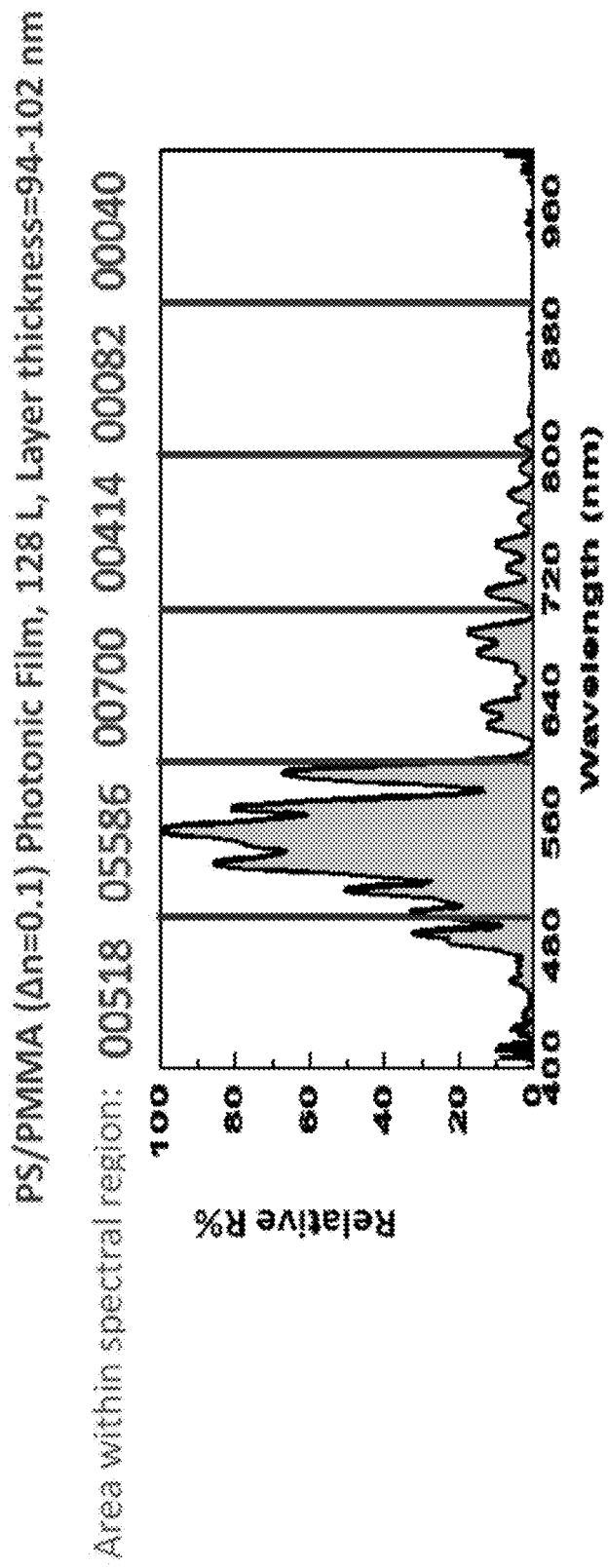
FIG. 14 illustrates a UV-VIS spectra of a 1-D photonic film in reflectance mode.
Figure 15A:
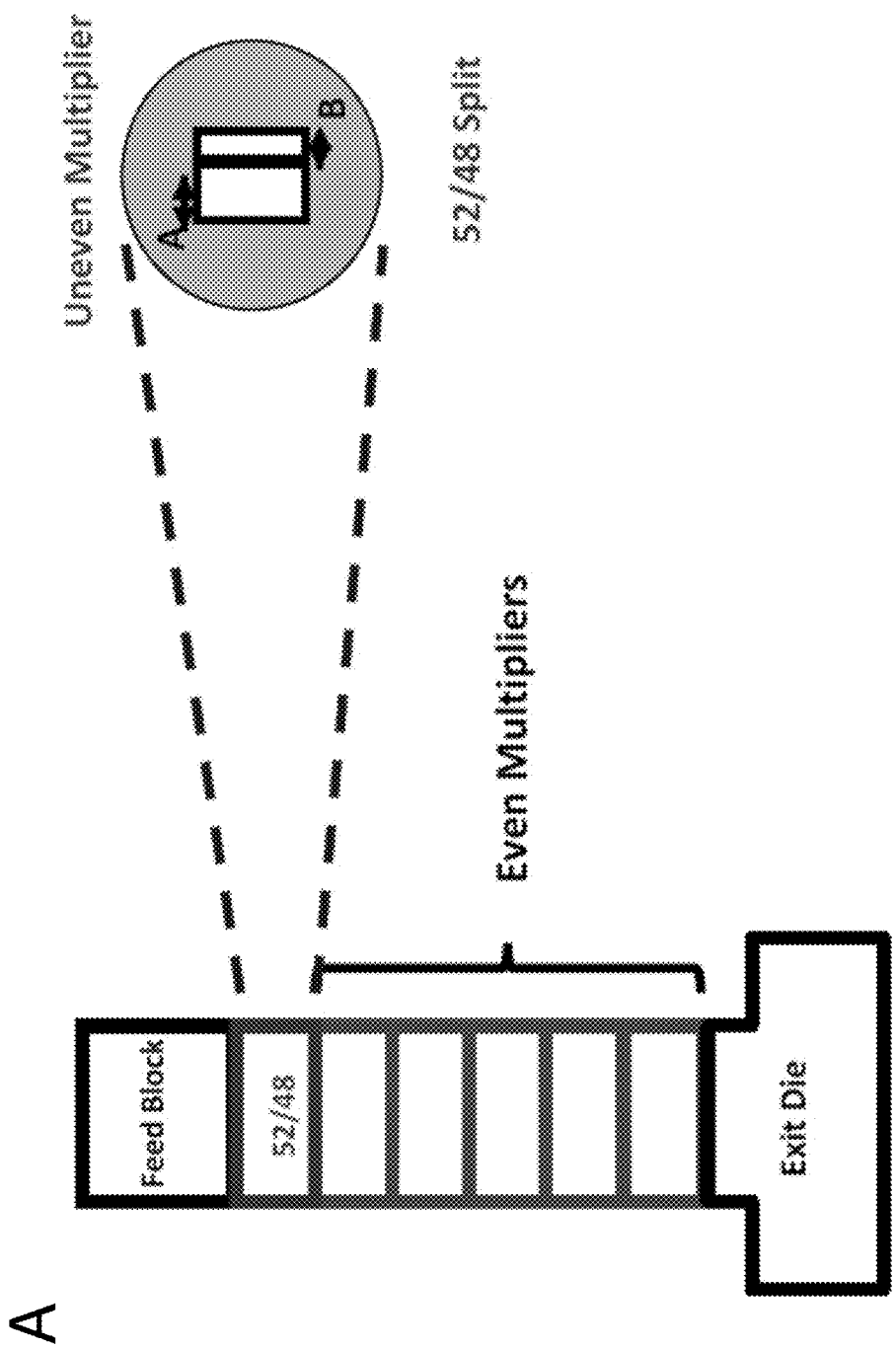
FIGS. 15(A-F) are a schematic illustration of a multilayer co-extrusion device with an uneven multiplier and resulting spectra of films so formed.
Figure 15B:
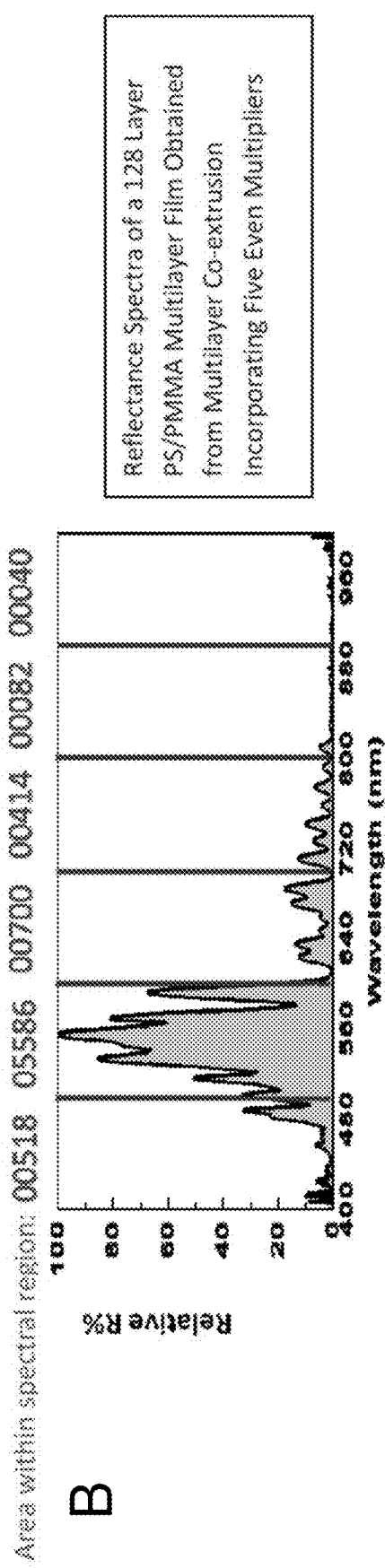
Figure 15C:
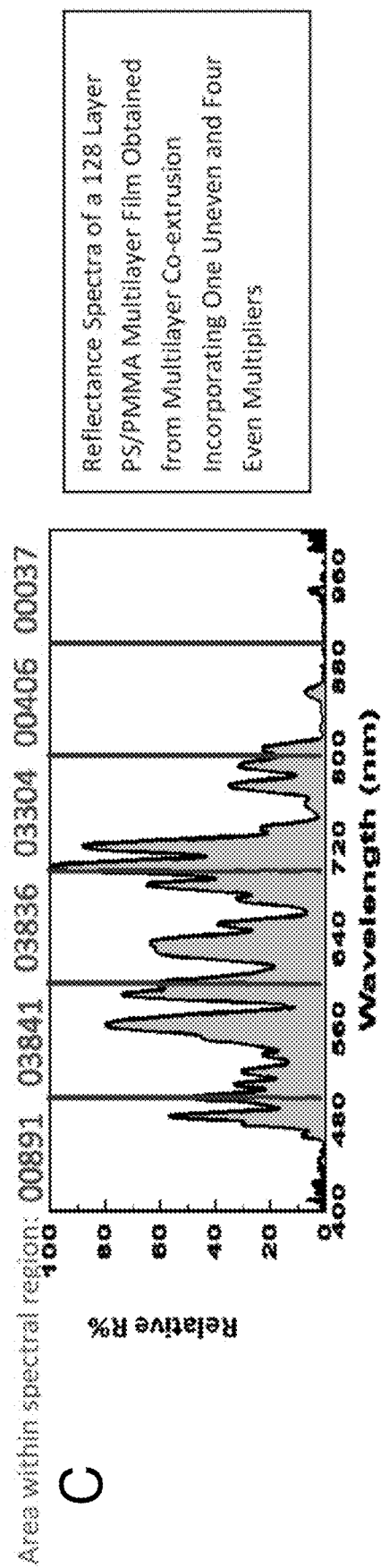
Figure 15D:
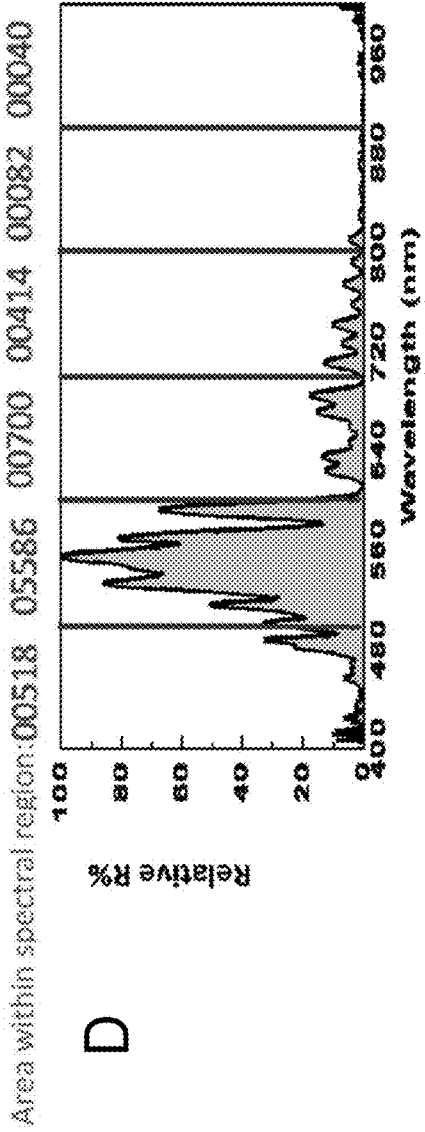
Figure 15E:
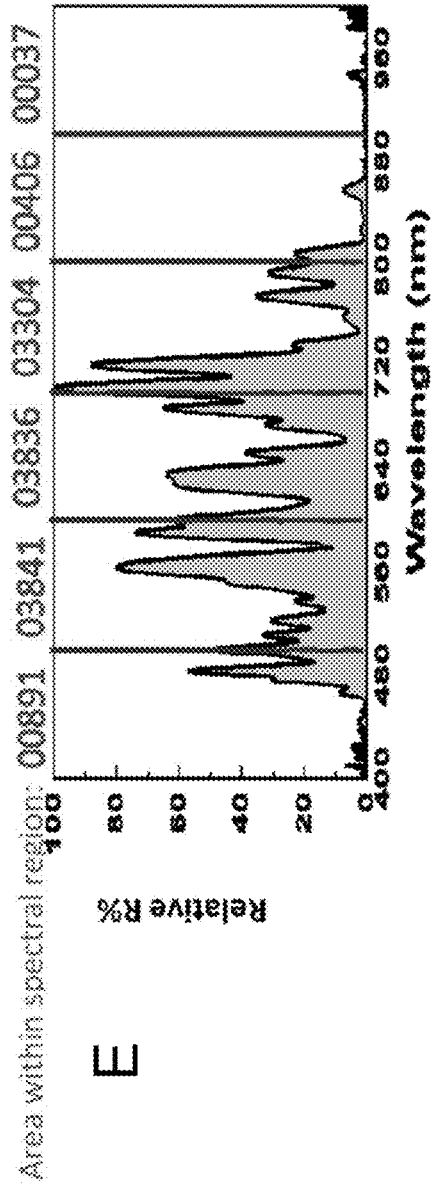
Figure 15F:
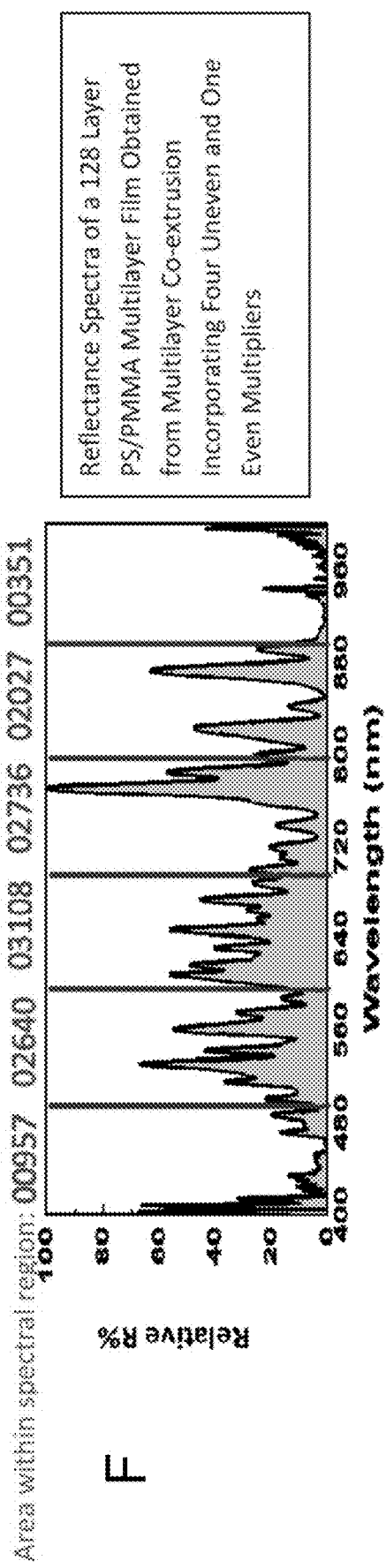

In some embodiments, the multilayer structure can be a 1-D photonic crystal that is prepared by microlayer coextrusion of the two polymeric materials. The 1-D photonic crystal can include alternating nanolayers of two or more polymer materials with individual layer thickness ranging from the microscale to the nanoscale. A typical two component (AB) multilayer coextrusion apparatus is illustrated in FIG. 14. The two component (AB) coextrusion apparatus can consist of two single screw extruders each connected by a melt pump to a coextrusion feedblock. The feedblock for this two component system combines polymer material (a) and polymer material (b) in an (AB) layer configuration. The melt pumps control the two melt streams that are combined in the feedblock as two parallel layers. By adjusting the melt pump speed, the relative layer thickness, that is, the ratio of A to B, can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence $(AB)_x$ where x is equal to $(2)^n$ and n is the number of multiplying elements. It is understood by those skilled in the art that the number of extruders used to fabricate the structure equals the number of components or polymer materials. Thus, a three-component multilayer (ABC . . . ), requires three extruders.

The multilayer structure can include at least 4, 6, 8, 10, 12, 14, 16, 18, 20, 30, 40, 50, 60, 70, 80, 90, 100 or more layers, including any number of layers within that range. For example, the multilayer structure can have from about 30 to about 10000 layers. The multilayer structure can be in the form of a film or sheet. By altering the relative flow rates or the number of layers, while keeping the film or sheet thickness constant, the individual layer thickness can be controlled. The multilayer structure film or sheet has an overall thickness ranging from 100 nanometers to 1000 micrometers, for example, from about 200 nanometers to about 500 micrometers and any increments therein. Further, the multilayer structures may be formed into a number of articles. The structures may be formed by coextrusion techniques initially into films or sheets which may then be post formed. Such post forming operations may include thermoforming, vacuum forming, or pressure forming. Further, through the use of forming dies, the multilayer structures may be formed into a variety of useful shapes including profiles, tubes and the like.

Non-uniform or disordered multilayer structures exhibiting unique optics can be produced with microlayer processing technology. It was found that when layer uniformity within a multilayer structure is not achieved the measure electromagnetic transmission or reflection spectrum and/or spectra will be complex and depend on the specific layer non-uniformity. Further, due to this layer inhomogeneity these spectrum and/or spectra will vary relative to the specific region of the multilayer structure from which the spectrum and/or spectra are achieved.

The non-uniform or disordered layer or multilayer structure of the multilayer polymeric photonic crystal structure can be achieved by any number of methods during the fabrication process. For example, individual layer thicknesses of the structure can be varied during coextrusion by variation of the exit die. Varying layer thicknesses by varying the exit dye was found to vary spectrum and/or spectra peak positions obtained from different regions of the structure, such as along the length or width of the film in increments as small as 1 mm or less. Individual layer thickness uniformity of the structure can also be varied by using uneven multipliers or layer multiplication. Varying layer thickness uniformity using uneven multipliers or layer multiplication was found to vary the peak population of spectrum and/or spectra obtained from different regions of the structure. Moreover, layer thickness distribution of the structure can be varied by varying the split ratio of uneven multipliers or the arrangement of uneven multipliers. Varying layer thickness distribution was found to vary peak distribution of spectrum and/or spectra obtained from different regions of the structure.

In other embodiments, a third polymer layer(s) (or fourth polymer layer, fifth polymer layer, or more) can be placed in the multilayer structure as a tie layer, barrier layer, toughening layer, and/or to provide a non-uniform or disordered layer structure. The third polymer layer(s) can be formed of a third polymer material and be randomly distributed in the multilayer structure or alternated with the first polymer layers and second polymer layers. The use third polymer layer(s) whether randomly distributed in the multilayer structure or alternated with the first polymer layers and second polymer layers can expand the utility of the multilayer structure. When the third polymer layer is a barrier layer, it is present as a single layer on one or both exterior major surfaces of the structure or as an interior layer. For example, suitable barrier layer materials such as hydrolyzed ethylene vinyl acetate, copolymers of polyvinylidene chloride, nitrile polymers, and nylons may be used in or on the multilayer body. Suitable adhesive materials, such as maleic anhydride grafted polyolefins may be used to bond such barrier layer materials to the multilayer structure. Alternatively, a third polymer layer may be used as a surface or skin layer on one or both major exterior surfaces. The skin layer may serve as scratch resistant, weatherable protective layer, as sacrificial layer or as decorative layer. Further, such skin layers may be post applied to the structure after coextrusion.

Advantageously, objects provided with security marking comprising the non-uniform or disordered layer multilayer structures of the multilayer photonic crystal structure can have various applications. For example, it is prohibitively difficult even for the manufacturer of a first object with such security marking to clone the object, i.e., to produce a second object, which possesses the same measurable irregularities of the security marking as the first object. Additionally, even for the manufacturer of a first object with such security marking, the required costs to clone the object, i.e., to produce a second object which has the same measurable irregularities as the first object, are higher than the value that is protected by the object in a certain security applications.

The electromagnetic transmission and/or reflection spectrum and/or spectra obtained from the non-uniform or disordered layer multilayer structure of the multilayer photonic crystal structure, which is converted to a signal that is indicative of the PUF can be a digital signal that is based on a binary question of whether or not the spectrum shows a peak within a spectrum and/or spectral region over a defined wavelength. For example, assuming a spectral resolution of 20 nm within the spectral region of 400 nm to 900 nm, there are already $2^{20}$ different possibilities, if the detection is limited to the binary question of whether or not the spectrum shows a peak within the respective 20 nm interval. In other words, a binary value of "0" or "1" may be assigned to each interval, one of these values indicating presence of a peak in that interval and the other value indicating absence of such peak. Accordingly, a digital string can be formed from the 20 binary values assigned to the 20 intervals into which said spectral region is divided and thus $2^{20}$, i.e., approximately $10^6$ different combinations can be represented by such string. If instead an interval of only 10 nm is used, the numbers increased to $2^{40}$, i.e., approximately $10^{11}$ different combinations. If in addition, in each interval further distinction is made in case of each peak, e.g., whether the respective peak is closer to a "full" peak or to only a "half" peak then in the case of 40 intervals the number of combinations is even increased to $3^{40}$, i.e., approximately $10^{18}$ combinations. Accordingly, it is virtually impossible, to create a mix of multilayer structures in such a way, that it shows the same spectrum, as the original multilayer structure it seeks to clone.

In other embodiments, data representing electromagnetic transmission and/or reflection spectrum and/or spectra obtained from the non-uniform or disordered layer multilayer structure of the multilayer photonic crystal structure, which is converted to a signal that is indicative of the PUF, can be provided as a spectral barcode having a continuous or a quantized range of allowed spectral values for a selected discrete subset of wavelengths. This can allow for a determination and scaling of the number of bits or other information units that can be encoded by the non-uniform or disordered layer multilayer structure of the multilayer photonic crystal structure. If, for example, in each interval of the spectrum the corresponding spectral value is quantized into one of four spectral levels, that interval of the spectrum can be used to code two bits of information represented by the PUF. A quantization can be preferable over a continuous range of allowed spectral values, as it may increase the robustness against distortions of the response generated by the non-uniform or disordered layer multilayer structure of the multilayer photonic crystal structure.

In still other embodiments, data representing electromagnetic transmission and/or reflection spectrum and/or spectra obtained from the non-uniform or disordered layer multilayer structure of the multilayer photonic crystal structure, which is converted to a signal that is indicative of the PUF, can be provided as a virtual pattern that represents as at least one recognized aspect or portion of the electromagnetic transmission and/or reflection spectrum and/or spectra. The recognized aspect can relate to a statistical measure applied to the electromagnetic transmission and/or reflection spectrum and/or spectra, such as an average distance between individual nodes of the pattern, a related variance or standard deviation, or any other statistical moment. Alternatively, according to another variant, the electromagnetic transmission and/or reflection spectrum and/or spectra may be scanned, e.g., in a matrix fashion, and thus converted into a string of bits, e.g., by using a discrimination threshold and representing matrix points showing a light intensity above the threshold by a "1" and all matrix points having a light intensity below the threshold as "0", or vice versa.

In some embodiments, the security mark includes at least one additional optical security feature arranged on or within an outer surface of the multilayer photonic crystal structure. The additional optical security features makes it possible to further increase the protection against forgery of the security marking or physical object to which it is applied. It is possible for the optical security feature to be perceived by an observer as combined information or superimposed items of information or to have an optically variable appearance. This makes tampering attempts even more difficult and also additionally makes it more difficult to forge the security marking.

The additional optical security feature can be provided in an outermost layer of multilayer photonic crystal structure. The additional optical security feature can include for example a UV or IR print, microprint, layer containing optically variable pigments, layer containing a refractive element or diffractive element, an isotropic or anisotropic matt structure, a relief hologram, a volume hologram, a zero-order diffraction structure, and/or a thin-film layer element generating a viewing-angle-dependent color shift effect. By combining several of these elements the protection against forgery can be further increased. UV print is invisible in visible light and only visible in ultraviolet light, in particular in a specific UV wavelength range. IR print is invisible in visible light and only visible in infrared light, in particular in a specific IR wavelength range.

In some embodiments, the additional security marking can include one or more transmissive diffraction structures which display one or more optical security features when observed in transmitted light. The transmissive diffraction structures can include an area which, at least at one tilt angle, has a transmissivity for at least one wavelength range of, for example, at least 30 nm from the wavelength range of visible light (380 nm to 740 nm) of more than 20%, in particular more than 50%. At least at one tilt angle, the transmissivity can be, for example, more than 50% in the wavelength range of from visible light and further preferably more than 80% in at least half of the wavelength range of visible light.

Transmissive diffraction structures can be provided on or within the multilayer photonic crystal structure which are designed to achieve a diffraction effect in transmission such that partial areas of the multilayer photonic crystal structure, which are covered with them, in each case display, as an optical security feature, a color-change effect that is recognizable to the human observer when observed in transmitted light against a light source directionally radiating white light, when the security marking is tilted and/or turned. When the security marking is observed in transmitted light, the security marking can display a change, for example, between a white or colorless transparent appearance and, for example, a red-colored or blue-colored appearance in the partial area when tilted and/or turned. Alternatively, the color-change effect can also take place in reverse order, i.e., the security marking displays a change, for example, between a red-colored or blue-colored appearance and a white or colorless transparent appearance in the partial area when tilted and/or turned. A further alternative is a color-change effect from, for example, red-colored to blue-colored. In the latter case, the security feature has a colored appearance at all observation and/or turn angles.

In some embodiments, two or more different transmissive diffraction structures can be arranged which display an optical security feature when observed in transmitted light. These different transmissive diffraction structures can be designed such that, when observed in transmitted light against a light source radiating white light, they display, for example, different color-change effects when the security element is tilted and/or turned, in particular they differ in relation to the tilt angle and/or turn angle at which a color is generated, or in relation to the color value which is generated at a particular tilt angle and/or turn angle. Through the use of two or more different transmissive diffraction structures, a plurality of striking and surprising security features can be realized on the security marking in addition to the PUF as described herein. Further, the security marking can include other transmissive diffraction structures that differ from the first and second diffraction structures. The other diffraction structures described herein can each case mutually differ from each other.

In some embodiments, differing diffraction structures provided on or within the security marking can differ in their relief shape and/or their relief depth or grating depth and/or their azimuth angle and/or their grating period. By relief shape, it is meant the shaping of the structure elements of which the transmissive diffraction structure is formed. Here, the diffraction structures can have different symmetrical relief shapes, for example, a first diffraction structure can have a sinusoidal relief shape and a second transmissive diffraction structure can have a rectangular relief shape. Further, it is also possible for the first diffraction structure to have an asymmetrical relief shape and for the second diffraction structure to have a symmetrical relief shape, or vice versa, or for the first or second diffraction structure to differ in relation to the asymmetry of the relief shape. The parameters, which influence the color-change effect the most, are preferably the grating period and the grating depth, as well as the azimuth angle.

The transmissive diffraction structures can also be formed of different types of transmissive diffraction structures. For example, the transmissive diffraction structures can differ in the effect that is recognizable to the human observer when observed in transmitted light. Such a difference can be a difference in the color spectrum of the transmitted light in an untilted and/or unturned state, a difference in the color spectrum of the transmitted light in a tilted and/or rotated state, tilt angle or tilt angle range, rotation angle or rotation angle range in which the color spectrum is changed, a difference in transmissivity in an untilted and/or rotated state, or a difference in transmissivity in a tilted and/or rotated state, alignment of the tilt axis and/or axis of rotation to achieve these effects.

The use and the arrangement of additional optical security features makes it possible to generate numerous optical security features which clearly improve the level of protection against forgery of the security marking. In addition, the security element obtains a greater optical variability and/or can be perceived under a wider range of different observation and illumination conditions.

Figure 22:
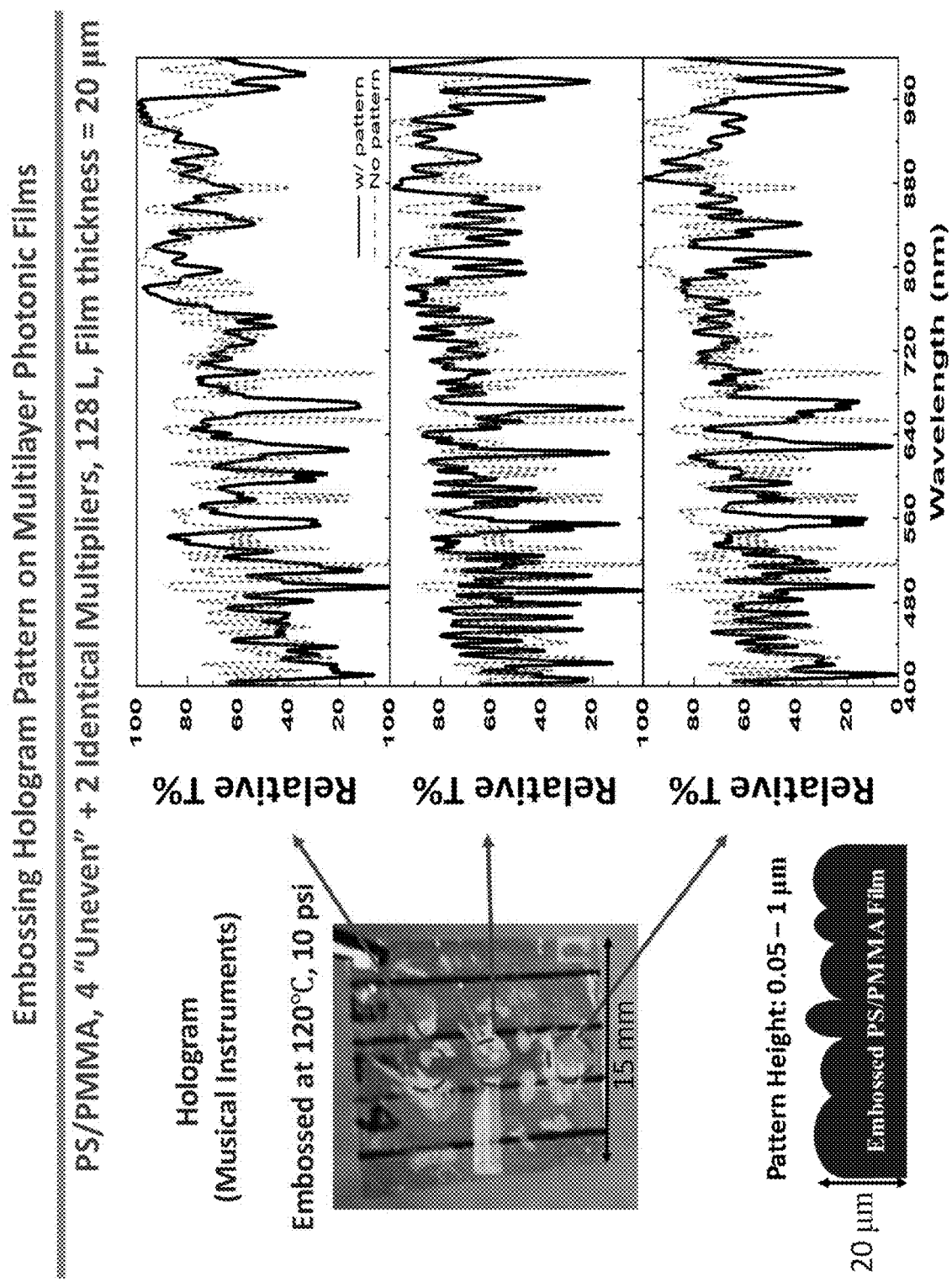
FIG. 22 illustrates holograms of musical instrument on multilayer photonic films and a transmission spectra of regions defined by the instrument in accordance with another embodiment.
Figure 23:
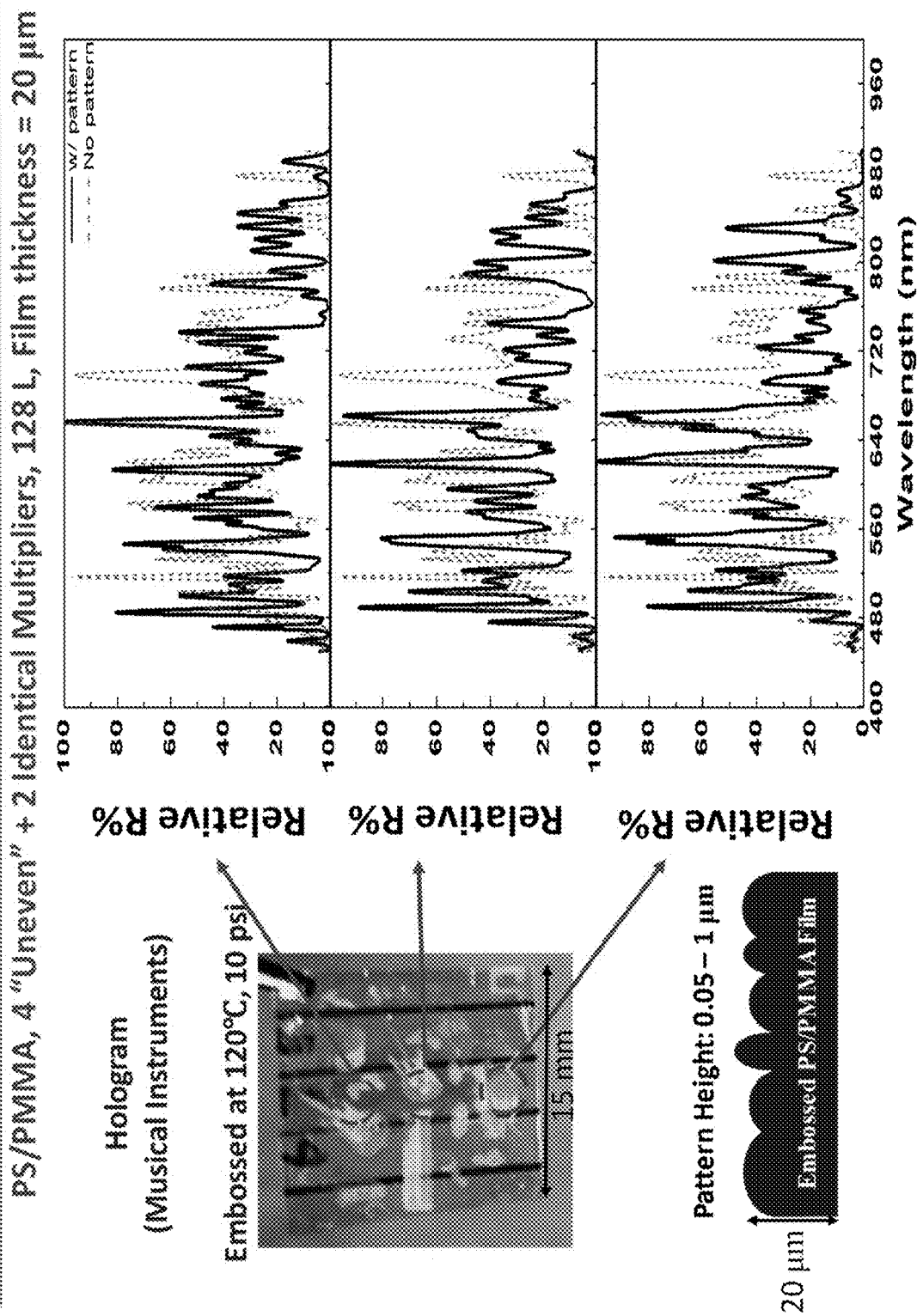
FIG. 23 illustrates holograms of musical instrument on multilayer photonic films and a reflectance spectra of regions defined by the instrument in accordance with another embodiment.

In some embodiments, the additional optical security features can be molded or embossed into an outer surface of multilayer photonic crystal structure in the form of various motifs. The motifs can include letters and numbers, a sequence of letters and numbers, logos, emblems, symbols, figurative representations, for example, the portrait of a person, symbols or the like. The motifs can be composed of individual image elements, such as dots, lines, mosaics, grids, surfaces, grayscale patterns or combinations thereof. The motifs can be used to define an area of a security marking in which electromagnetic transmission and/or reflection spectrum and/or spectra is obtained. For example, as shown in FIGS. 22 and 23, electromagnetic transmission and/or reflection spectrum and/or spectra were obtained from non-uniform or disordered layer multilayer structure of a multilayer photonic crystal structure in area defined by a musical instrument hologram. The use of the motif along with the PUF of non-uniform or disordered layer multilayer structure of a multilayer photonic crystal structure makes it possible to produce a concealed feature (PUF) that only becomes recognizable through the electromagnetic transmission and/or reflection spectrum within the motif. Moreover, degradation or alteration of the motif provides additional means to determine if the security marking has been tamperered with or damaged.

Figure 24:
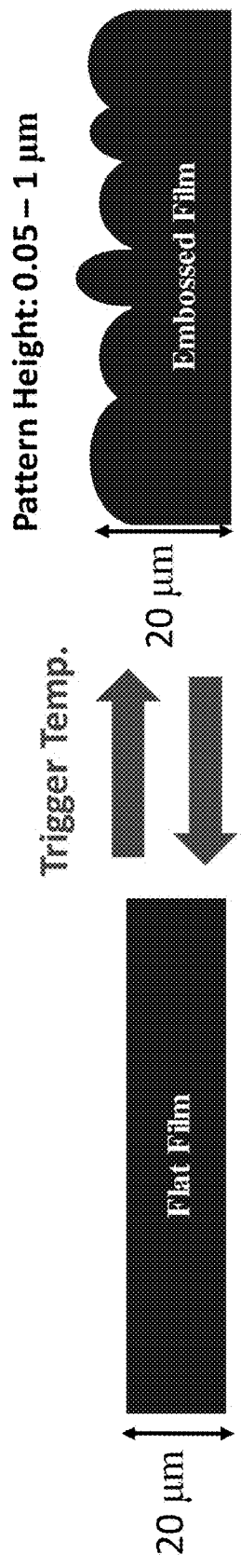
FIG. 24 illustrates a schematic showing surface programming of a multilayer 1-D photonic film.

Optionally, the additional optical security features can be formed in a multilayer photonic crystal structure that include a shape memory material that is capable of undergoing at least one temperature induced shape transition from a temporary shape to a permanent shape. The polymeric composite shape memory can have a first electromagnetic transmission and/or reflection spectrum and/or spectra at the temporary shape a second electromagnetic transmission and/or reflection spectrum and/or spectra at the permanent. As shown in FIG. 24, a shape memory material as described herein can be embossed to provide a temporary shape that defines the additional optical features that can be changed upon exposure to a trigger temperature and transition of the shape memory material to a permanent shape. Advantageously, this provides both a change in optical security feature and the electromagnetic transmission and/or reflection spectrum and/or spectra to provide additional means to determine if the security marking has been tampered with or exposed to a triggering temperature.

The security mark having a PUF that includes a multilayer photonic crystal structure and an optional additional optical security feature can be provided on any physical object. The physical object can be a product that includes one or more items for consumption or use and a packaging thereof. The security marking can be arranged on or contained within at least one of the items for consumption or use or on or within the packaging of the items. An authentication or validation code can also be provided on one or more of the packaging for authentication of the product. In one example, the product can be a pharmaceutical product comprising for example a bottle containing a liquid pharmaceutical or a blister pack containing tablets as an item for consumption and a cardboard box surrounding the bottle or blister pack as a packaging. The security marking can be provided as a label placed on the bottle. A digital signature corresponding to the security marking can be printed on the packaging in the form of a two-dimensional barcode, e.g., a QR-code or a DATA-MATRIX code. A signal generated from the security marking can be compared to the barcode to provide authentication of the pharmaceutical product.

It will be appreciated, that security marking can be provided on any physical object. Examples of such physical objects can include at least one of a bank note, a cheque, a bond, a bank card, a credit card, a cheque card, a currency, a money card, an identification item, an identity item, an access item, an item for granting a permission, an identification card, an identity card, a driving license, a personalized item, a passport, a product, a branded product, a consumer product, a pharmaceutical product, a health product, a nutritional product, a digital content on a data carrier, a software product on a data carrier, a document, a paper document, a security document, a personalized document, a certificate, a share certificate, a certificate of indebtedness, a contract, an insurance policy, a testament, a component, a hardware component, an electronic component, a computer chip, a book, a handbook, a postage stamp, a parking ticket, a transportation ticket, or a ticket for admission to an event. Other examples of physical objects the security marking can be applied to can include a medical device; a laboratory equipment; a spare part or component of a device or system or any other object where there is a need to prevent counterfeiting, in order to avoid malfunctions, health threats or other risks.

The invention is further illustrated by the following example, which is not intended to limit the scope of the claims.

EXAMPLES

FIGS. 3(A-C) illustrate schematics (A) and (B) and an image (C) showing an example of a multilayer photonic system. FIG. 3A illustrates a schematic of a 128 Layer PVAc/PU (Pellethane) Film that has a layer thickness of Layer Thickness=94-102 nm. FIG. 3B is a schematic of illustrating the location and dimensions for UV-VIS measurement at three locations on a multilayer 1-D photonic film. FIG. 3C illustrate an image of actual film specimen with a coating identifying locations for UV-VIS analysis and having dimensions similar to the schematic of a multilayer 1-D photonic film.

Figure 4:
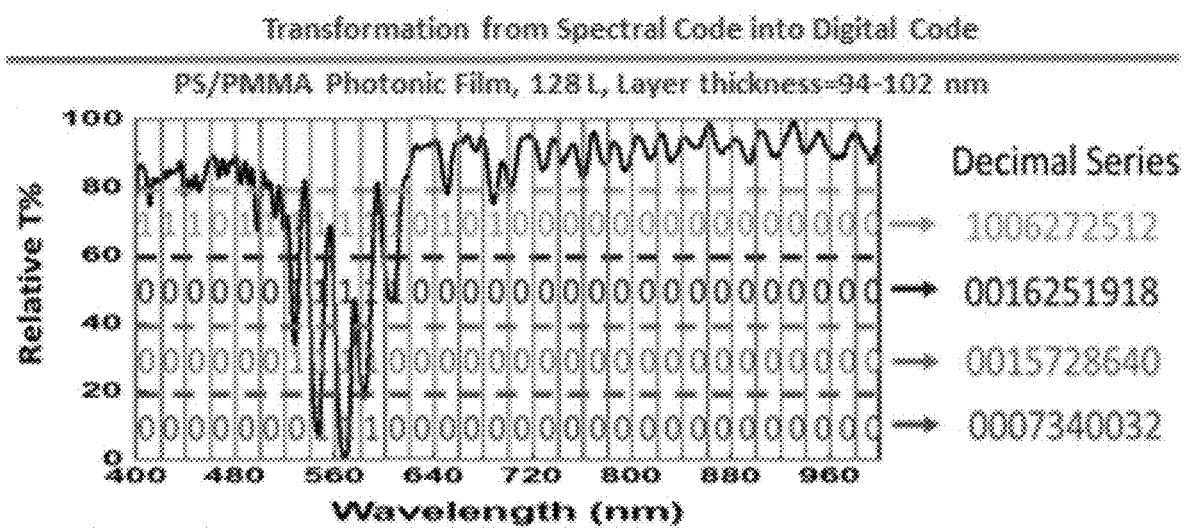
FIG. 4 is a schematic illustrating transformation from one spectral code to a digital code.

FIG. 4 is a schematic illustrating transformation from one spectral code to a digital code. For optical spectrum processing, four "critical relative transmission" are set at T=20%, 40%, 60%, and 80%. The target wavelength range is divided intervals of 20 nm for each. For transformation into binary digital code, below each "critical relative transmission", if a peak appears in a certain interval, a digital "1" will be assigned, if not peak appears, a digital "0" will be assigned. For transformation into other digital series, the generated binary code can be transformed into decimal, hexadecimal . . . etc.

Figure 5:
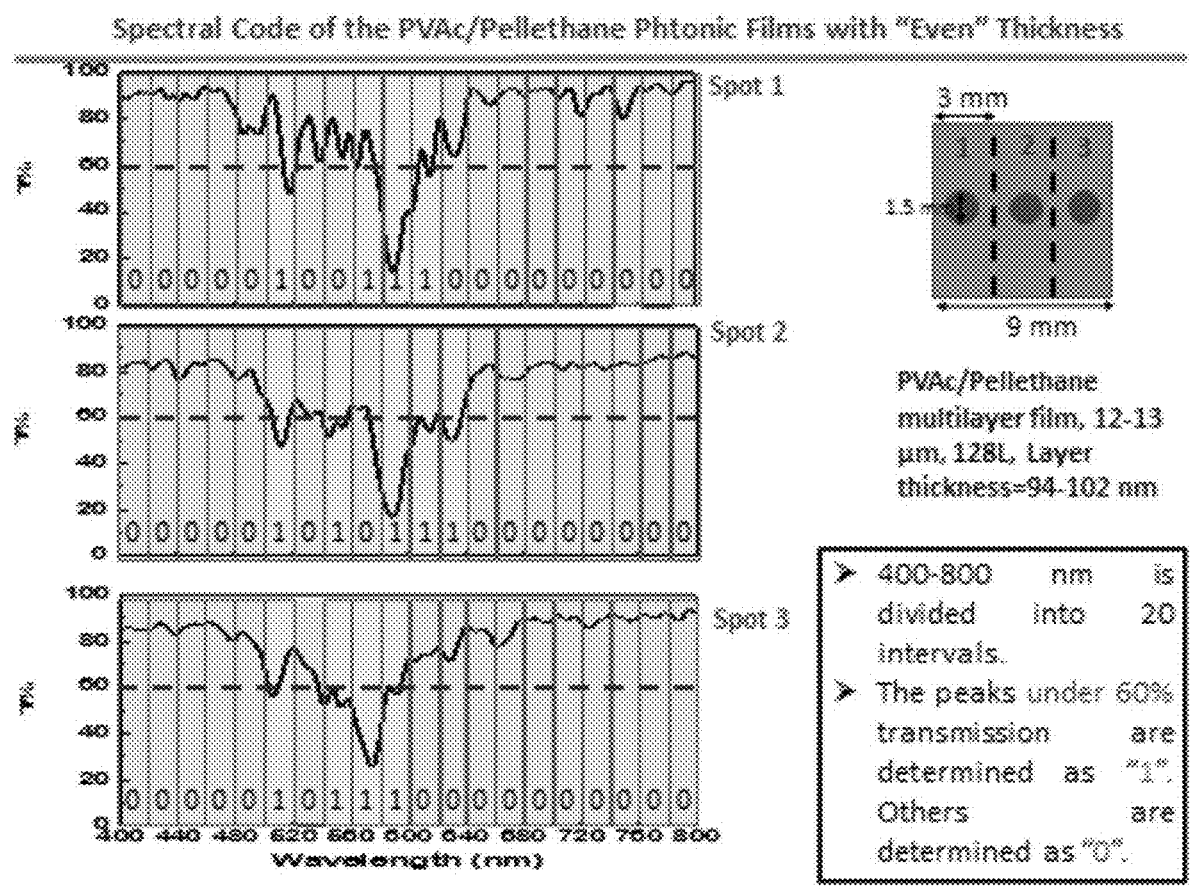
FIG. 5 illustrates UV-VIS spectra of the multilayer 1-D photonic films with relatively even layer thicknesses at three adjacent locations on the same film.

FIG. 5 illustrates UV-VIS spectra of a 12-13 μm PVAc/Pellethane multilayer 1-D photonic film containing 128 alternating layers with relatively even layer thicknesses at three adjacent locations on the same film. Layer thickness is relatively even and is between 94 nm and 102 nm.

Figure 6:
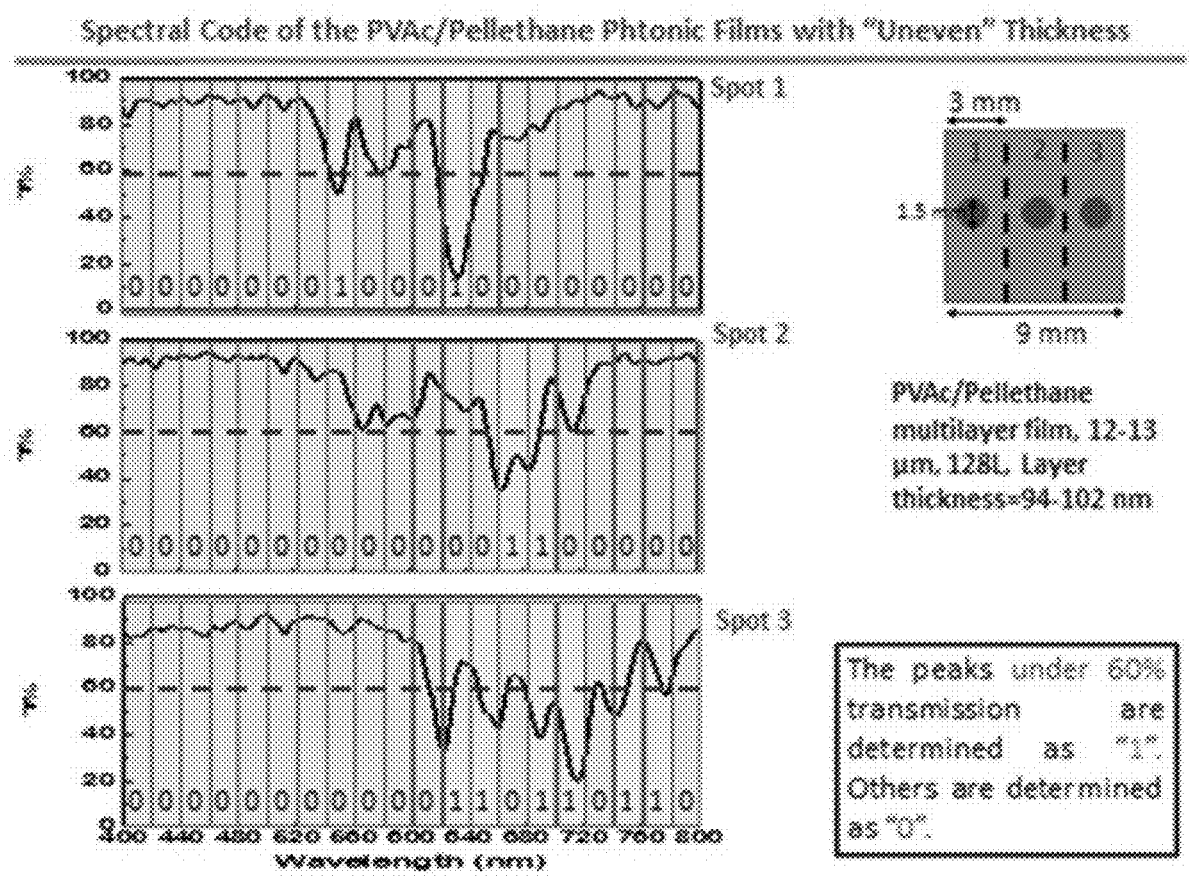
FIG. 6 illustrates UV-VIS spectra of the multilayer 1-D photonic films with relatively uneven layer thicknesses at three adjacent locations on the same film.

FIG. 6 illustrates UV-VIS spectra of a 12-13 μm PVAc/Pellethane multilayer 1-D photonic film containing 128 alternating layers with relatively uneven layer thicknesses at three adjacent locations on the same film. Layer thickness is relatively uneven and is between 94 nm and 102 nm.

FIGS. 7(A-C) illustrate UV-VIS spectra of PS/PMMA multilayer 1-D photonic films having 128 alternating layers with relatively uneven layer thicknesses between 94 nm-102 nm at the same location using three different UV-VIS detection diameters, i.e., 3 mm, 6 mm, and 9 mm.

Figure 8A:
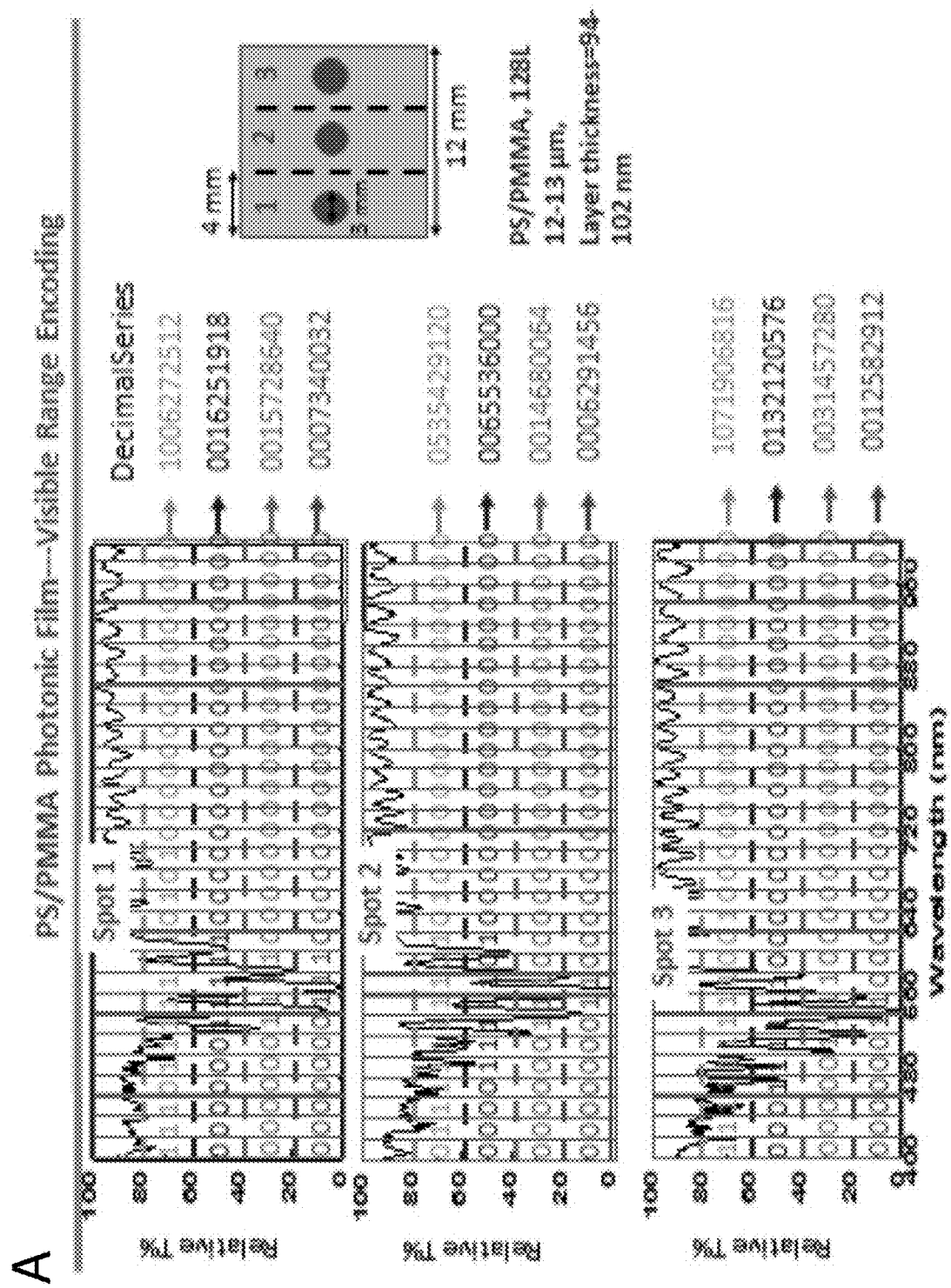
FIGS. 8(A-B) illustrates VIS spectra of the multilayer 1-D photonic films in transmission mode and reflection mode.
Figure 8B:
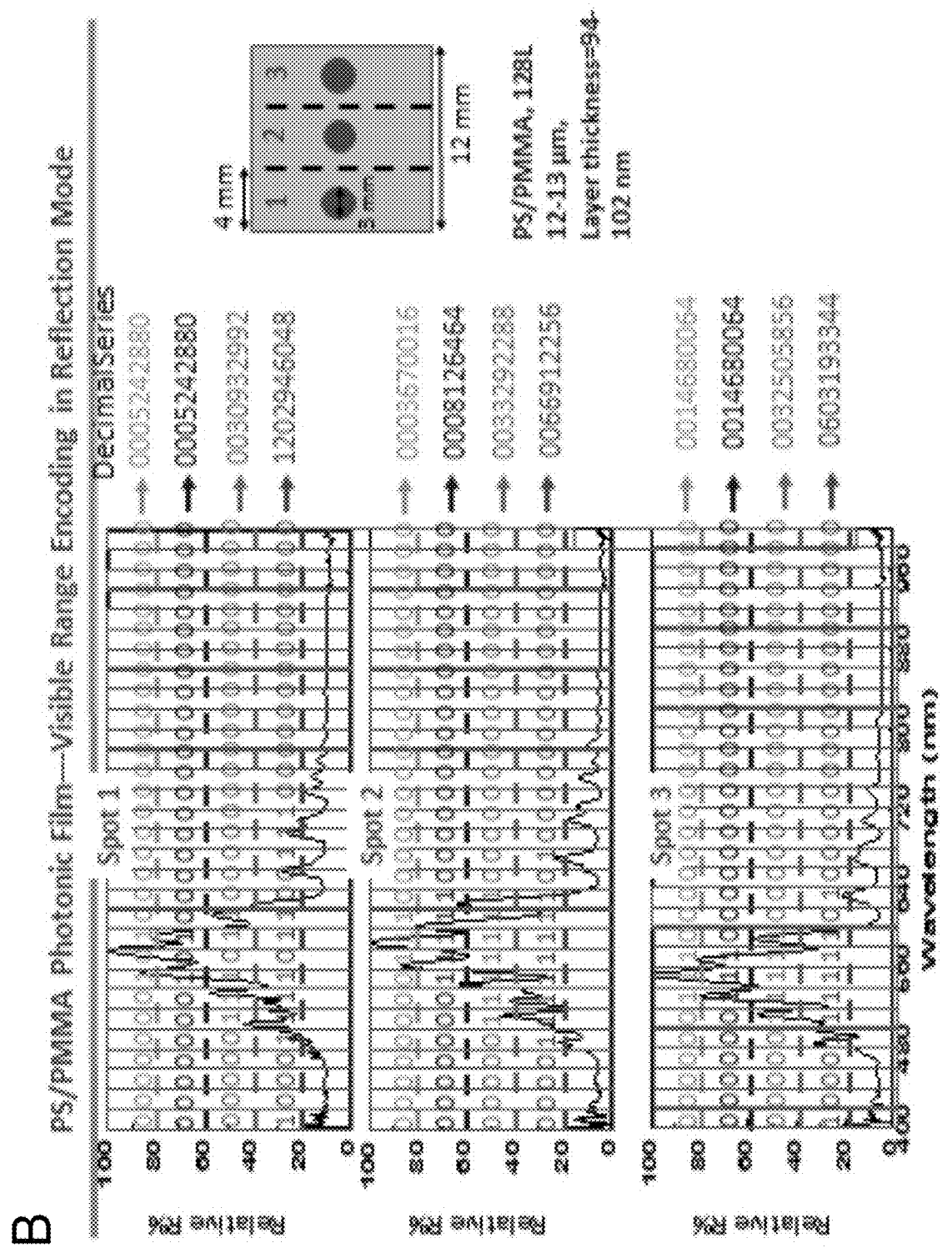

FIGS. 8(A-B) illustrates Visible spectra of a multilayer PS/PMMA 1-D photonic films having 128 alternating layers with relatively uneven layer thicknesses between 94 nm-102 nm in (A) transmission mode and (B) reflection mode.

Figure 9A:
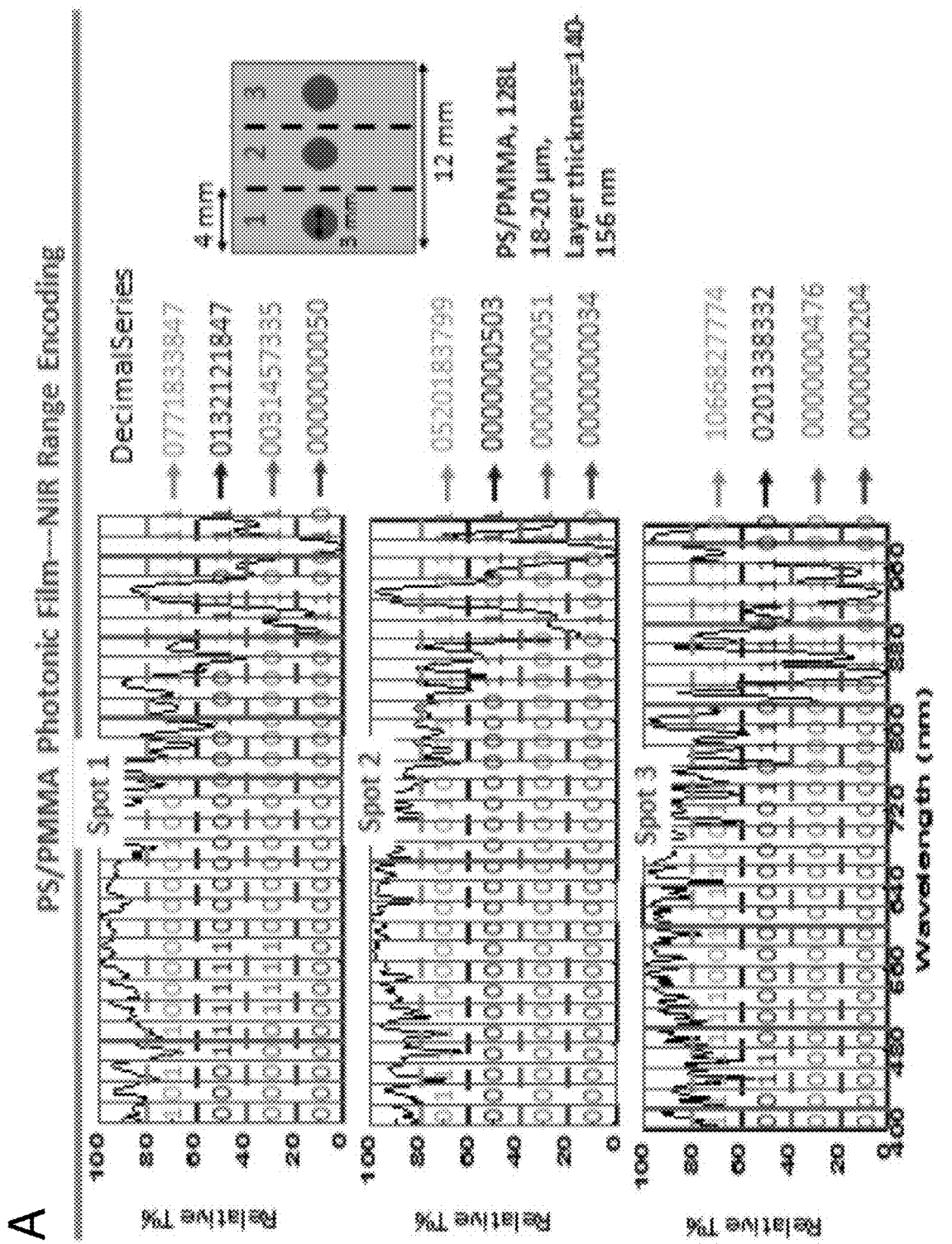
FIGS. 9(A-B) illustrates Near-Infrared spectra of the multilayer 1-D photonic films in transmission mode and reflection mode.
Figure 9B:
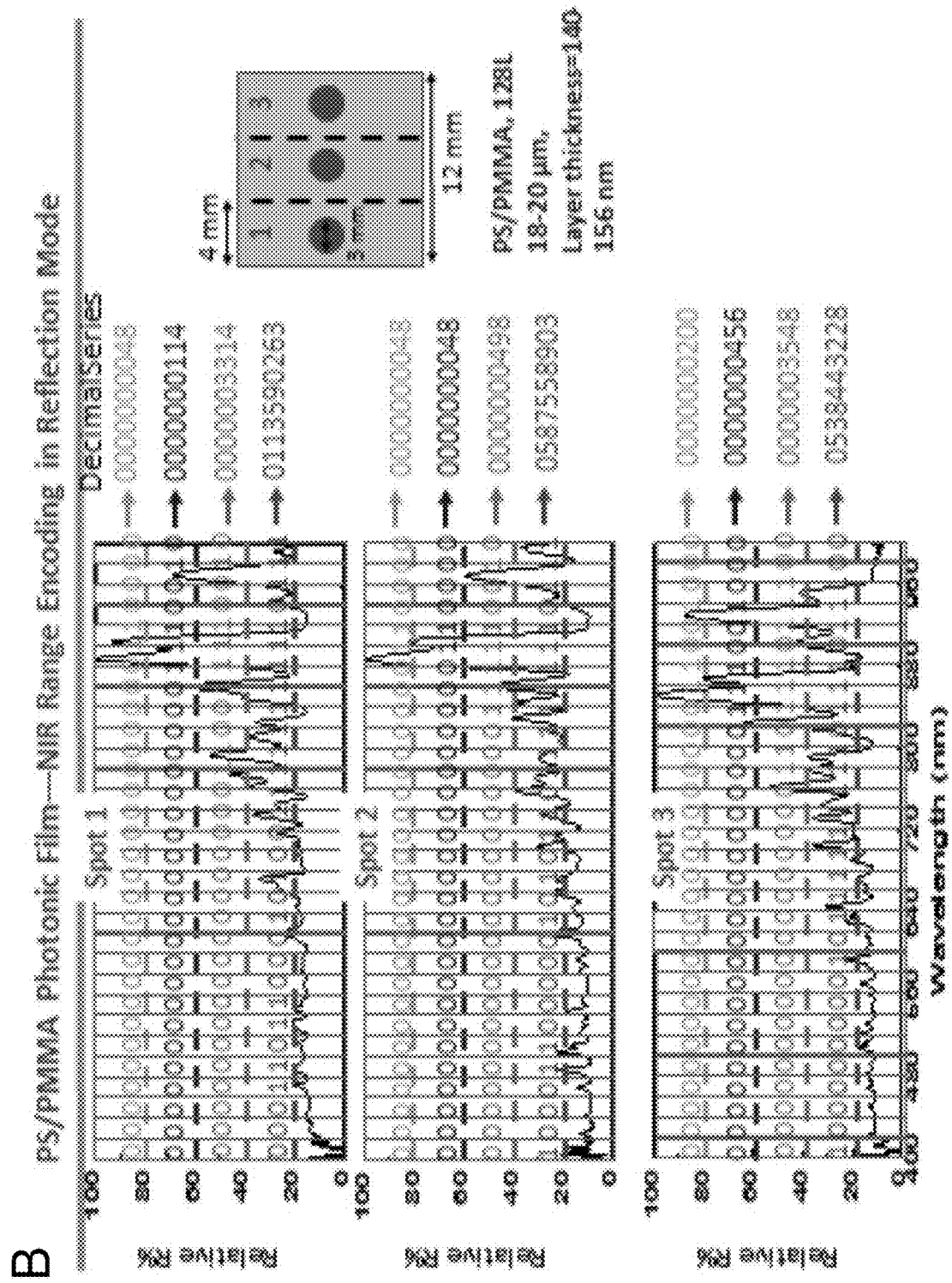

FIGS. 9(A-B) illustrates Near-Infrared spectra of a multilayer PS/PMMA 1-D photonic films having 128 alternating layers with relatively uneven layer thicknesses between 94 nm-102 nm in (A) transmission mode and (B) reflection mode.

Figure 10:
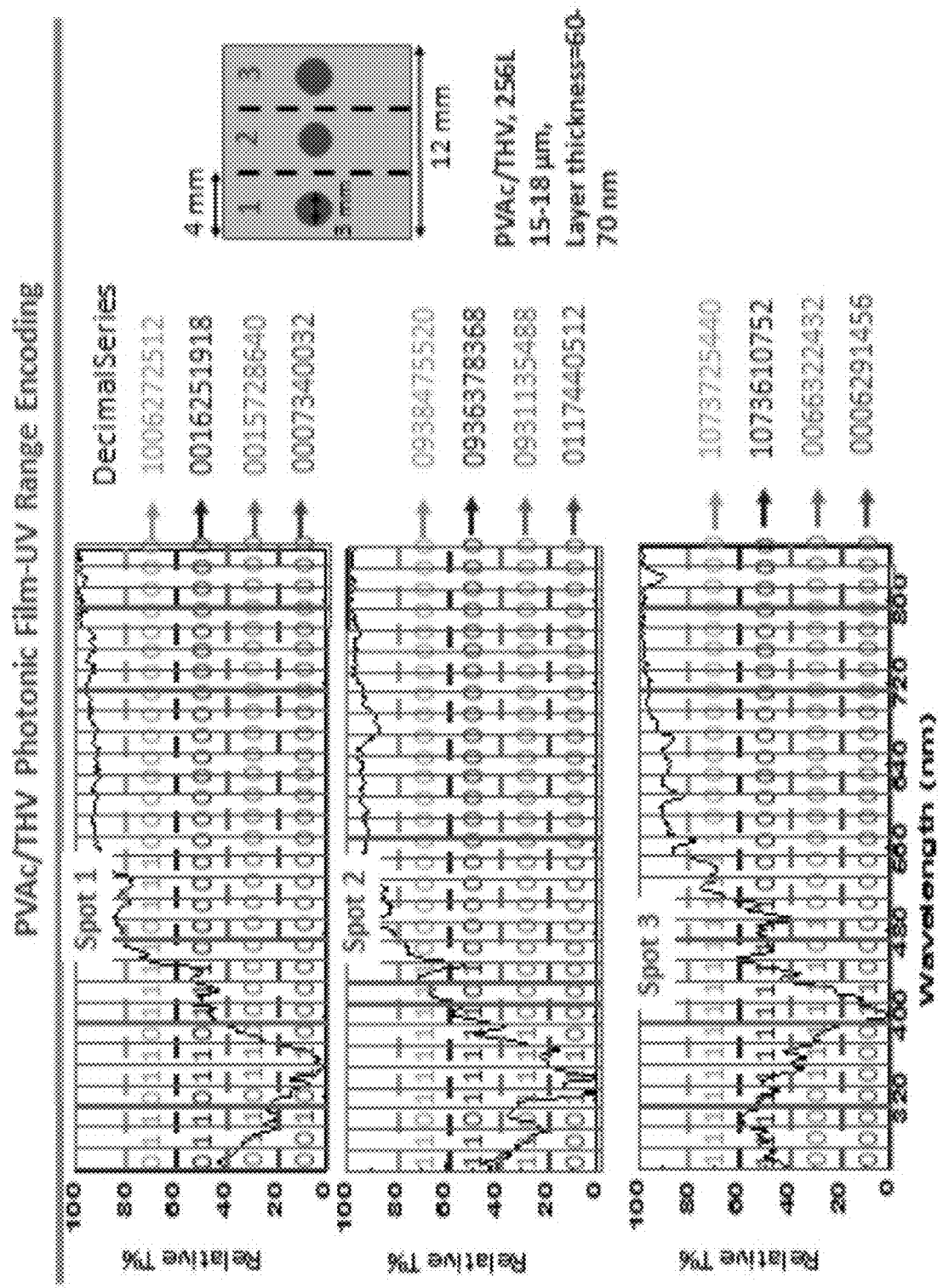
FIG. 10 illustrates UV spectra of the multilayer 1-D photonic films in transmission mode and reflection mode.

FIG. 10 illustrates UV spectra of a multilayer PS/PMMA 1-D photonic films having 128 alternating layers with relatively uneven layer thicknesses between 94 nm-102 nm in transmission mode and reflection mode.

Figure 11A:
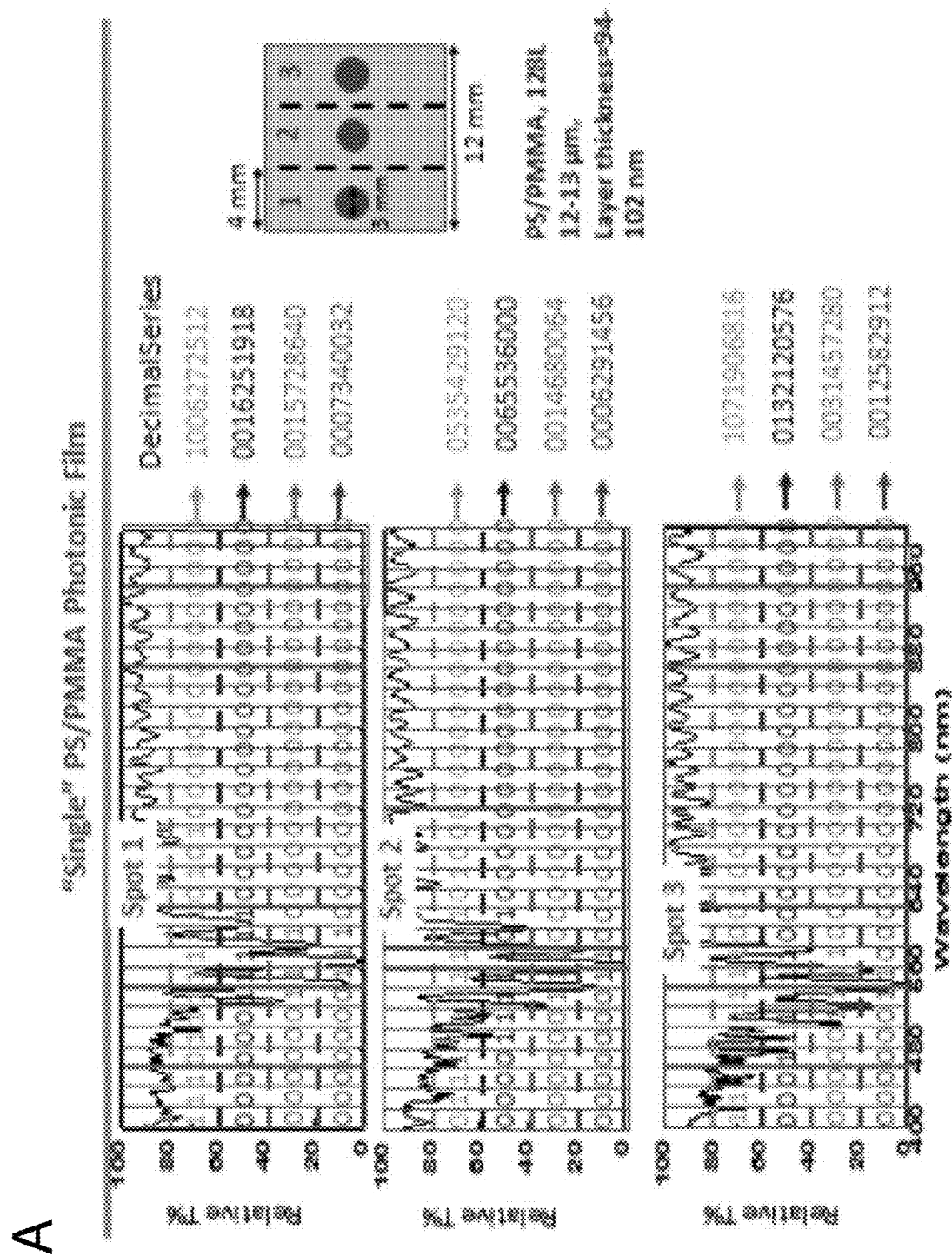
FIGS. 11(A-C) illustrate overlapping of spectra from two dissimilar photonic films.
Figure 11B:
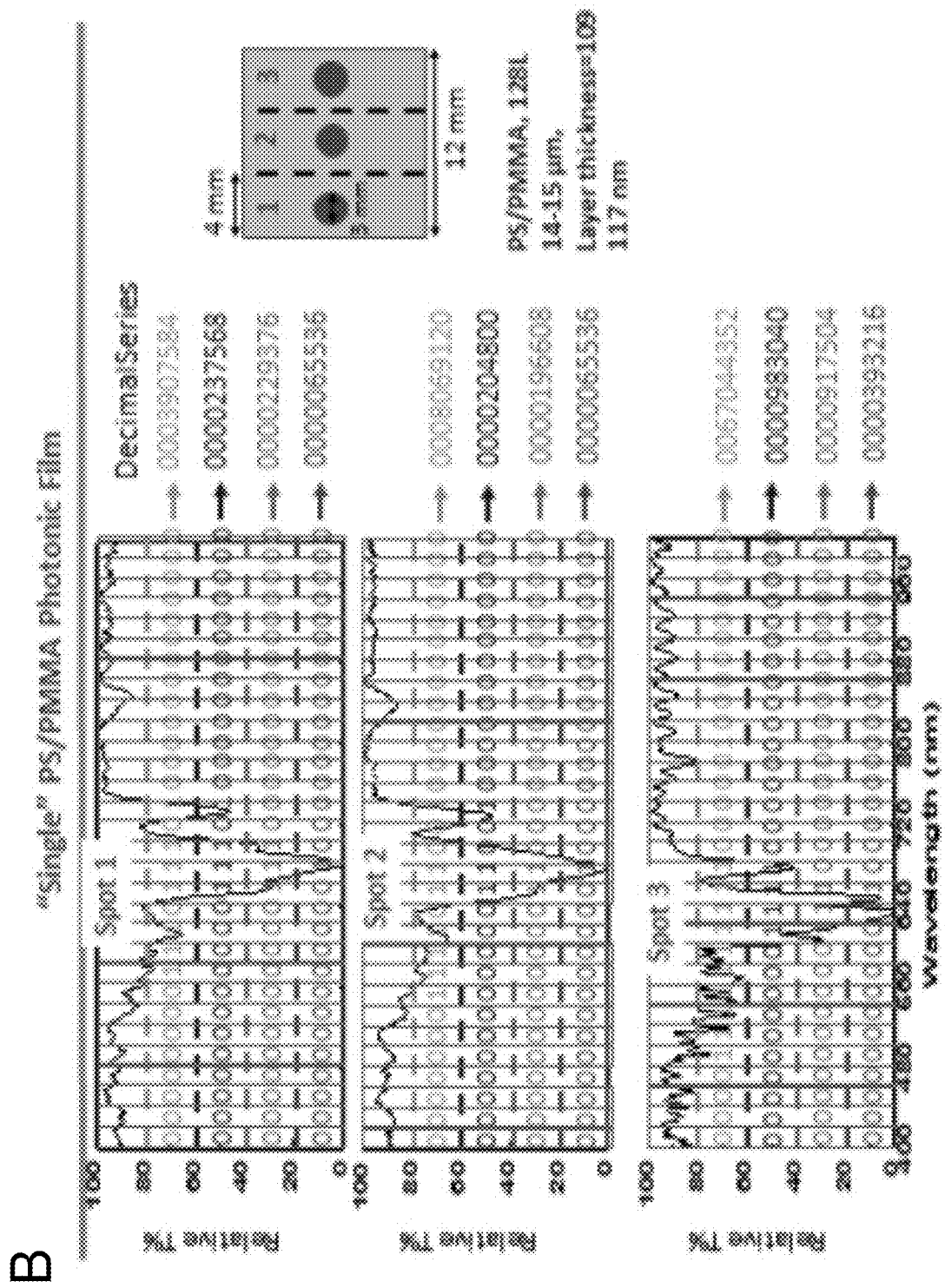
Figure 11C:
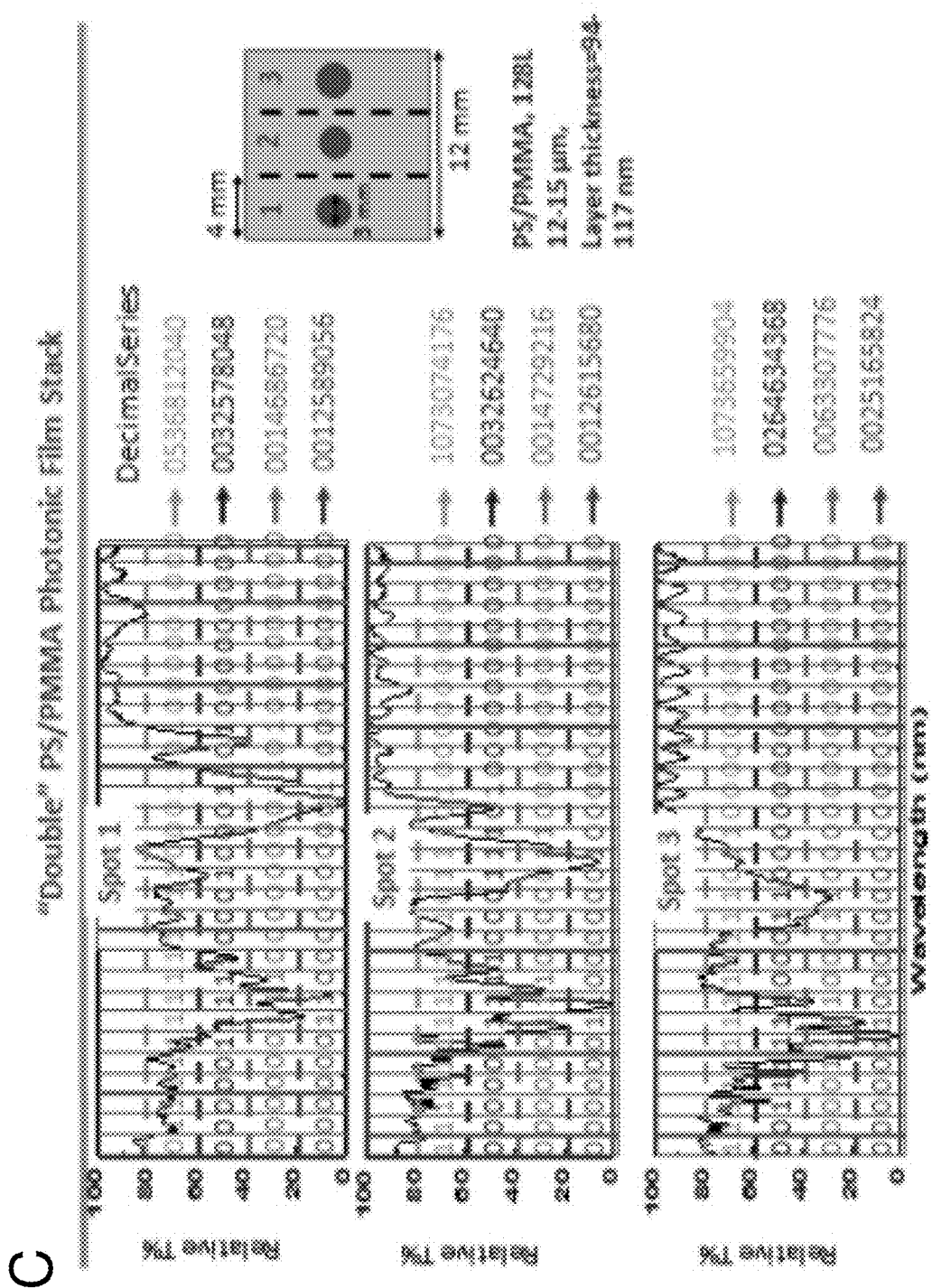

FIGS. 11(A-C) illustrates overlapping of spectra from two dissimilar multilayer PS/PMMA 1-D photonic films having 128 layer with relatively uneven layer thicknesses between (A) 94 nm-102 nm and (B) 109 nm to 117 nm.

Figure 12:
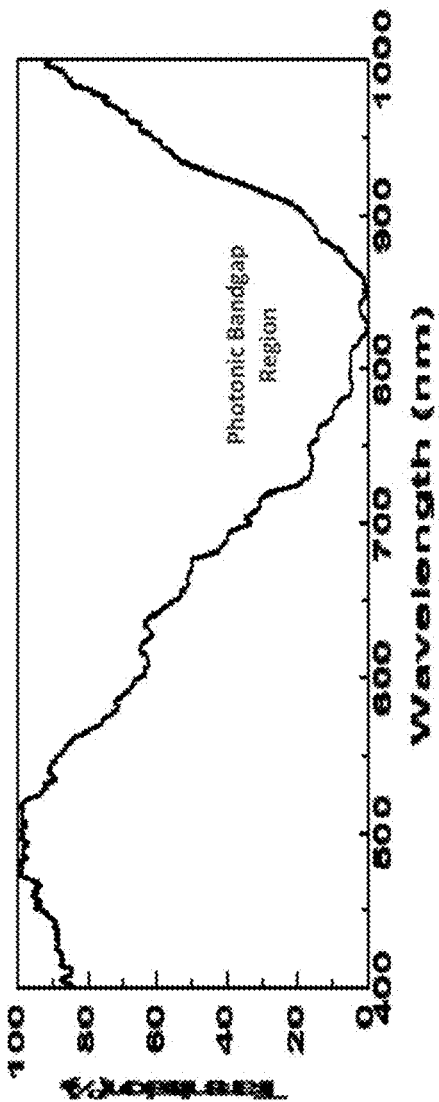
FIGS. 12 and 13 illustrate spectra of a multilayer 1-D photonic film that includes an optical dye.
Figure 13:
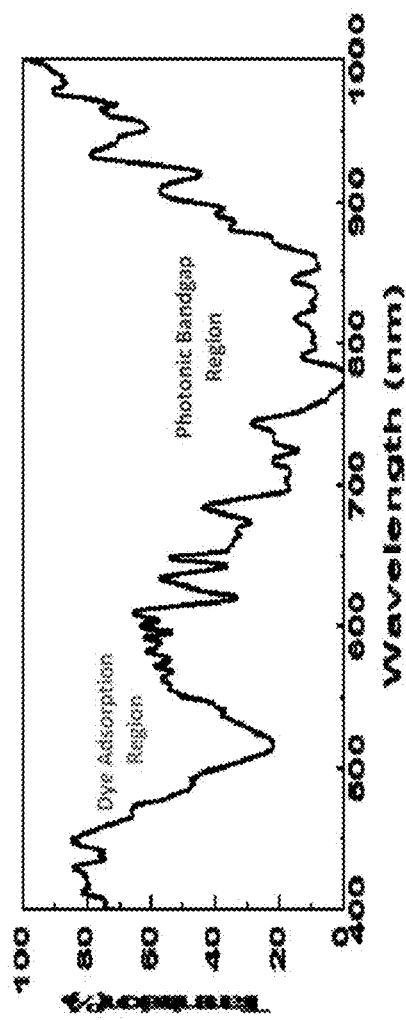

FIGS. 12 and 13 illustrates spectra of a multilayer PETG/PVDF-HFP 1-D photonic films having 128 alternating layers and a multilayer PETG/PVDF-HFP 1-D photonic films having 128 alternating layers that includes an R6G optical dye to enhance randomness into the transmission spectra.

FIG. 14 illustrates a UV-VIS spectra of a multilayer PS/PMMA 1-D photonic films having 128 alternating layers with relatively uneven layer thicknesses between 94 nm-102 nm in reflectance mode and the transformation in a digital representation by integrated areas method.

FIGS. 15(A-F) are a schematic illustration of (A) a multilayer co-extrusion device with an uneven multiplier and resulting spectra of multilayer PS/PMMA 1-D photonic films having 128 alternating layers with relatively uneven layer thicknesses between 94 nm-102 nm formed using (B) five even multipliers, (C) one uneven and four even multipliers, (D) five even multipliers, (E) one uneven and four even multipliers, and (F) four uneven and one even multipliers.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims.

All publications and patents mentioned in the above specification are herein incorporated by reference.

Having described the invention, the following is claimed:

1. A security marking, comprising:
a shape memory material that is capable of undergoing at least one environmentally induced shape transition from a temporary shape to a permanent shape, the shape memory material having a first electromagnetic transmission and/or reflection spectrum and/or spectra at the temporary shape and a differing second electromagnetic transmission and/or reflection spectrum and/or spectra at the permanent shape, wherein the shape memory material includes one or more polymer materials that are multilayer coextruded to form disordered and/or non-uniform polymer layers and multiplied to form a film that has a randomness defined by disorder and/or non-uniformity within the film that result from the multilayer coextrusion and multiplying processes, wherein the first electromagnetic transmission and/or reflection spectrum and/or spectra at the temporary shape and the differing second electromagnetic transmission and/or reflection spectrum and/or spectra at the permanent shape film of the security marking are unique to the film.

2. The security marking of claim 1, wherein the film includes polymer layers with dissimilar indices of refraction.

3. The security marking of claim 1, wherein the multilayer coextrusion and multiplying processes produce a plurality of first polymer layers of a first polymer material and second polymer layers of a second polymer material that are stacked.

4. The security marking of claim 3, wherein the first polymer layers and the second polymer layers are randomly stacked and/or the thicknesses of at least some of the plurality of the first polymer layers or the second polymer layers varies between the first polymer layers and the second polymer layers.

5. The security marking of claim 3, wherein at least one of the plurality of the first polymer layers or the second polymer layers includes a light absorbing dye.

6. The security marking of claim 3, wherein at least one of the plurality of the first polymer layers or the second polymer layers further comprise an organic or inorganic material designed to affect the refractive index of the film.

7. The security marking of claim 3, wherein the film comprises about 4 to about 500,000 first polymer layers and second polymer layers.

8. The security marking of claim 7, wherein the first polymer layers and the second polymer layers have thicknesses of about 5 nm to about 1 µm.

9. The security marking of claim 1, the film comprising a multilayer polymer film.

10. The security marking of claim 1, further comprising adding at least on optical security feature on or within the film, the optical feature being recognizable in incident light.

11. The security marking of claim 10, wherein the at least one additional optical feature includes a security print, a UV or IR print, a microprint, a layer containing optically variable pigment, a refractive element, a diffractive element, an anisotropic matt structure, a relief hologram, a volume hologram, a zero-order diffraction structure, semi-reflective element, or a thin-film layer element.

12. The security marking of claim 10, wherein the at least one additional optical feature includes at least one transmissive diffraction structure which displays different color changing effects when the security marking is tilted and/or turned.

13. The security marking of claim 1, wherein the disordered and/or non-uniform layers are formed by varying polymer layer thicknesses during the multilayer coextrusion and multiplying processes.

14. The security marking of claim 13, wherein the polymer layer thicknesses are varied during the multilayer coextrusion and multiplying processes by varying an exit die, using uneven multipliers and/or uneven polymer layer multiplication.

15. The security of claim 14, wherein the polymer layer thicknesses are varied by varying a split ratio of the uneven multipliers or an arrangement of the uneven multipliers.

16. An object comprising at least one security marking of claim 1, wherein the object comprises at least one of a bank note, a cheque, a bond, a bank card, a credit card, a cheque card, a currency, a money card, an identification item, an identity item, an access item, an item for granting a permission, an identification card, an identity card, a driving license, a personalized item, a passport, a product, a branded product, a consumer product, a pharmaceutical product, a health product, a nutritional product, a digital content on a data carrier, a software product on a data carrier, a document, a paper document, a security document, a personalized document, a certificate, a share certificate, a certificate of indebtedness, a contract, an insurance policy, a testament, a component, a hardware component, an electronic component, a computer chip, a book, a handbook, a postage stamp, a parking ticket, a transportation ticket, or a ticket for admission to an event.

* * * * *